United States Patent
Matsuura et al.

(10) Patent No.: US 7,496,333 B2
(45) Date of Patent: Feb. 24, 2009

(54) TRANSMISSION CIRCUIT AND COMMUNICATION APPARATUS EMPLOYING THE SAME

(75) Inventors: Toru Matsuura, Osaka (JP); Kaoru Ishida, Osaka (JP)

(73) Assignee: Panasonic Corporation, Osaka (JP)

( * ) Notice: Subject to any disclaimer, the term of this patent is extended or adjusted under 35 U.S.C. 154(b) by 248 days.

(21) Appl. No.: 11/633,510

(22) Filed: Dec. 5, 2006

(65) Prior Publication Data

US 2007/0135117 A1 Jun. 14, 2007

(30) Foreign Application Priority Data

Dec. 13, 2005 (JP) ............................. 2005-358708

(51) Int. Cl.
H04B 1/02 (2006.01)
H04B 1/04 (2006.01)

(52) U.S. Cl. ..................... 455/108; 455/110; 455/127.1

(58) Field of Classification Search ................... 455/91, 455/114.1, 114.2, 127.1, 127.2, 126, 63.1, 455/67.13, 501, 570, 108, 110; 375/295, 375/296, 300; 330/10, 136
See application file for complete search history.

(56) References Cited

U.S. PATENT DOCUMENTS

| | | | | |
|---|---|---|---|---|
| 4,947,455 | A * | 8/1990 | Swanson | 455/127.1 |
| 6,256,482 | B1 * | 7/2001 | Raab | 455/108 |
| 7,092,683 | B2 * | 8/2006 | Tanaka et al. | 455/108 |
| 7,139,534 | B2 * | 11/2006 | Tanabe et al. | 455/108 |
| 7,176,947 | B2 * | 2/2007 | Kudo et al. | 345/690 |
| 2004/0101065 | A1 | 5/2004 | Hagh et al. | |
| 2005/0008093 | A1 | 1/2005 | Matsuura et al. | |
| 2006/0009169 | A1 * | 1/2006 | Arayashiki | 455/108 |
| 2006/0264186 | A1 * | 11/2006 | Akizuki et al. | 455/108 |
| 2007/0009062 | A1 * | 1/2007 | Matsuura et al. | 375/296 |
| 2007/0013567 | A1 * | 1/2007 | Matsuura et al. | 341/143 |
| 2007/0129032 | A1 * | 6/2007 | Matsuura et al. | 455/127.2 |
| 2007/0254622 | A1 * | 11/2007 | Matsuura et al. | 455/403 |
| 2008/0031381 | A1 * | 2/2008 | Matsuura et al. | 375/297 |
| 2008/0068240 | A1 * | 3/2008 | Matsuura | 341/143 |

FOREIGN PATENT DOCUMENTS

JP 5-37263 2/1993

* cited by examiner

*Primary Examiner*—Sonny Trinh
(74) *Attorney, Agent, or Firm*—Wenderoth, Lind & Ponack, L.L.P.

(57) ABSTRACT

A small-size transmission circuit is provided which outputs a transmission signal having high linearity independently of a magnitude of an output power, and operates with high efficiency. A signal generating section generates quadrature data based on input data. A computation section compares an amplitude component of the quadrature data with a predetermined amplitude threshold value, and outputs an amplitude signal, a first phase signal, and a second phase signal. A regulator outputs a voltage controlled depending on the amplitude signal. An angle modulation section and an angle modulation section angle-modulate the phase signal to output first and second angle-modulated signals. An amplitude modulation section and an amplitude modulation section amplitude-modulate the first and second angle-modulated signals using a voltage controlled depending on the amplitude signal to output the angle-modulated and amplitude-modulated signals as a first modulated signal and a second modulated signal. A combining section combines the first and second modulated signals to output a transmission signal.

18 Claims, 27 Drawing Sheets

F I G. 7
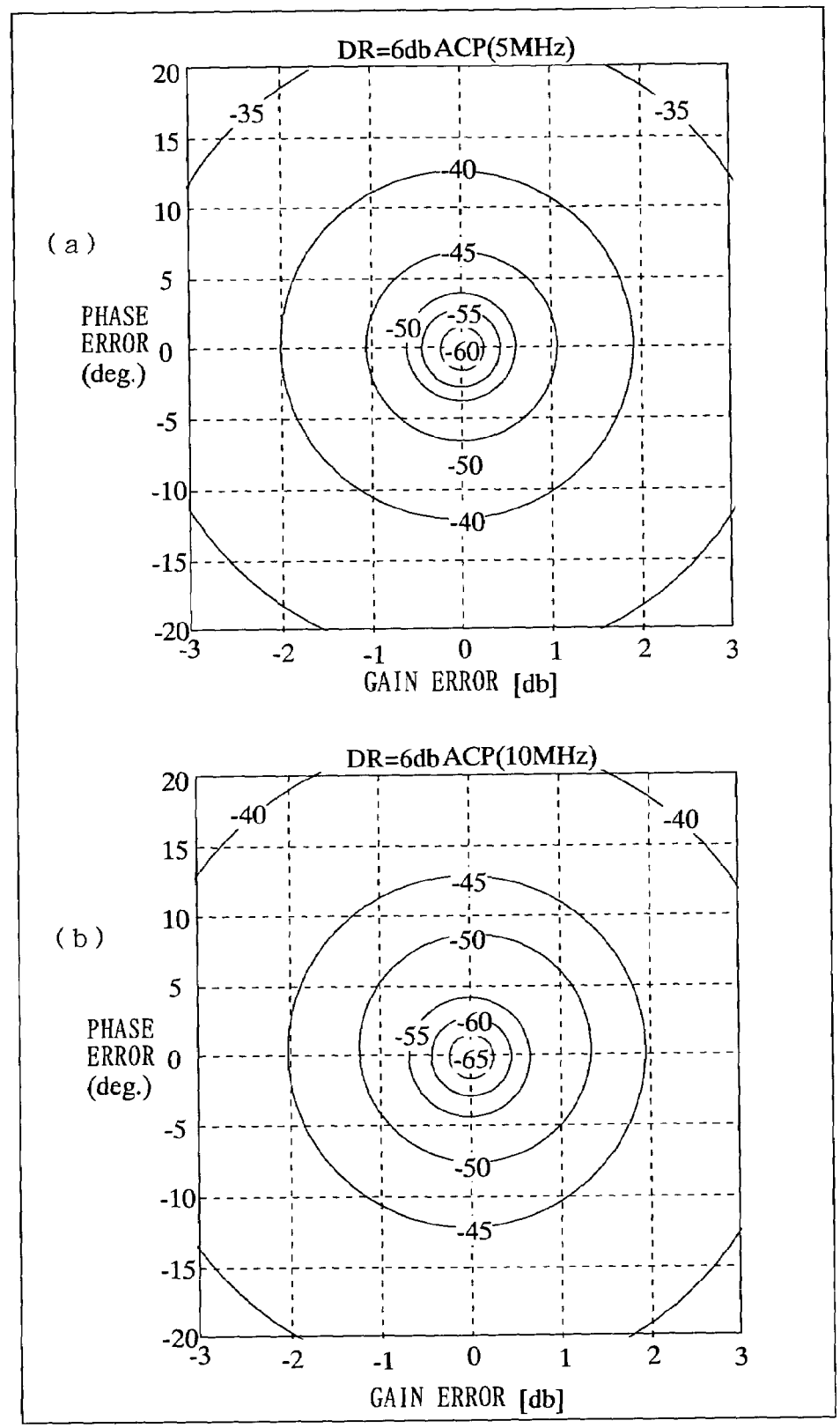

FIG. 13A

| AMPLITUDE OF SQUARE ROOT OF TRANSMISSION POWER INFORMATION P | a1 | a2 | a3 | a4 | a5 | a6 | ... |
|---|---|---|---|---|---|---|---|
| AMPLITUDE THRESHOLD VALUE 2m0 | K/a1 | K/a2 | K/a3 | K/a4 | K/a5 | K/a6 | ... |

FIG. 13B

| AMPLITUDE OF SQUARE ROOT OF TRANSMISSION POWER INFORMATION P | a1 | a2 | a3 | a4 | a5 | a6 | ... |
|---|---|---|---|---|---|---|---|
| GAIN | L*a1 | L*a2 | L*a3 | L*a4 | L*a5 | L*a6 | ... |

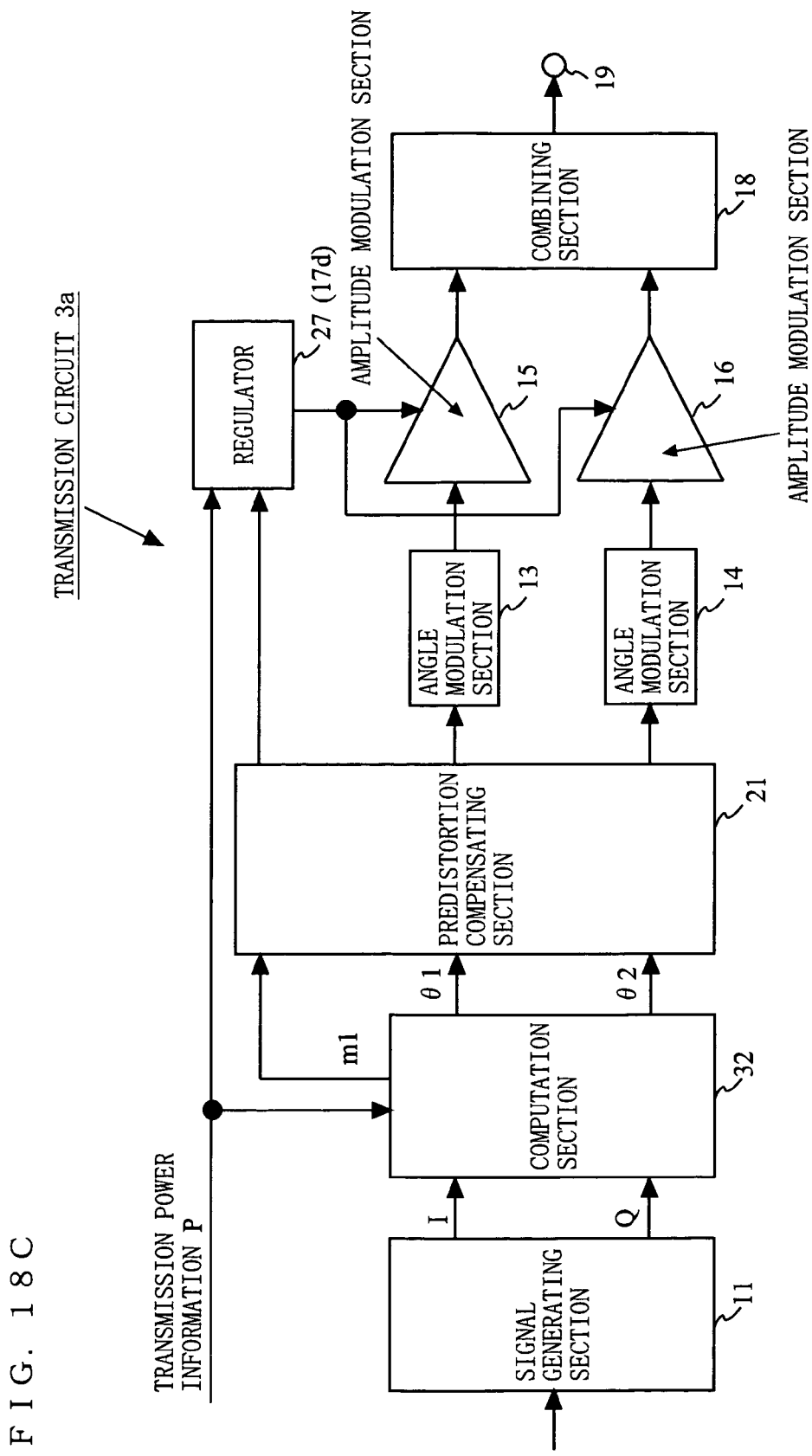

TRANSMISSION CIRCUIT AND COMMUNICATION APPARATUS EMPLOYING THE SAME

BACKGROUND OF THE INVENTION

1. Field of the Invention

The present invention relates to a transmission circuit for use in a communication apparatus for mobile telephony, wireless LAN, or the like. More particularly, the present invention relates to a small-size transmission circuit which outputs a transmission signal having high linearity independently of a magnitude of an output power and operates with high efficiency, and a communication apparatus employing the transmission circuit.

2. Description of the Background Art

There is a demand for a communication apparatus for mobile telephony, wireless LAN, or the like which can secure the linearity of a transmission signal and operate with low power consumption no matter whether it operates within a large or small power. In such a communication apparatus, a small-size transmission circuit is employed which outputs a transmission signal having high linearity independently of a magnitude of the output power and operates with high efficiency. Hereinafter, conventional transmission circuits will be described.

As a conventional transmission circuit, for example, there is a transmission circuit which utilizes a modulation method, such as quadrature modulation or the like, to generate a transmission signal (hereinafter referred to as a quadrature modulation circuit). Note that the quadrature modulation circuit is widely known and will not be described. As a conventional transmission circuit which outputs a transmission signal having high linearity with higher efficiency than that of the quadrature modulation circuit, for example, there is a transmission circuit 500 illustrated in FIG. 20. FIG. 20 is a block diagram illustrating a configuration of the conventional transmission circuit 500. In FIG. 20, the conventional transmission circuit 500 comprises a signal generating section 501, an angle modulating section 502, a regulator 503, an amplitude modulation section 504, and an output terminal 505.

In the conventional transmission circuit 500, the signal generating section 501 generates an amplitude signal and a phase signal. The amplitude signal is input to the regulator 503. The regulator 503 supplies a voltage depending on the input amplitude signal to the amplitude modulation section 504. The phase signal is input to the angle modulating section 502. The angle modulating section 502 subjects the input phase signal to angle modulation to output an angle-modulated signal. The angle-modulated signal output from the angle modulating section 502 is input to the amplitude modulation section 504. The amplitude modulation section 504 subjects the angle-modulated signal to amplitude modulation using the voltage supplied from the regulator 503, to output an angle-modulated and amplitude-modulated signal. This modulated signal is output as a transmission signal from the output terminal 505. Note that such a transmission circuit 500 is called a polar modulation circuit.

As a conventional transmission circuit which outputs a transmission signal having high linearity with higher efficiency than that of quadrature modulation circuits, for example, there is a transmission circuit 600 illustrated in FIG. 21 which is called LINC (Linear Amplification using Non-linear Components). FIG. 21 is a block diagram illustrating a configuration of the conventional transmission circuit 600. In FIG. 21, the conventional transmission circuit 600 comprises a constant-amplitude wave generating circuit 601, an amplifier 602, an amplifier 603, and a combining circuit 604.

The constant-amplitude wave generating circuit 601 outputs two modulated signals having different phases and a constant amplitude (hereinafter referred to as a constant-amplitude signal) based on an input signal. The two constant-amplitude signals output from the constant-amplitude wave generating circuit 601 are amplified in the amplifier 602 and the amplifier 603, and are then input to the combining circuit 604. The combining circuit 604 combines an output signal S1 of the amplifier 602 with an output signal S2 of the amplifier 603, and outputs the combined signal as a transmission signal S0.

Here, the transmission signal S0, the output signal S1 of the amplifier 602, and the output signal S2 of the amplifier 603 can be represented by:

$$S0(t) = m(t)\exp[j\theta(t)] = S1(t) + S2(t) \tag{10}$$

$$S1(t) = Mx\, \exp[j\{\theta(t) + \varphi(t)\}] \tag{11}$$

$$S2(t) = Mx\, \exp[j\{\theta(t) - \varphi(t)\}] \tag{12}$$

$$\varphi(t) = \cos^{-1}\left[\frac{m(t)}{2Mx}\right] \tag{13}$$

where m(t) represents an amplitude component of the transmission signal S0, θ(t) represents a phase component of the transmission signal S0, Mx represents a magnitude of an amplitude of the output signal S1 of the amplifier 602 or the output signal S2 of the amplifier 603, and ψ(t) represents a deviation of a phase of the output signal S1 or the output signal S2 from the transmission signal S0.

FIG. 22 is a diagram for specifically describing an operation of the conventional transmission circuit 600. Referring to FIG. 22, the conventional transmission circuit 600 outputs the transmission signal S0 which has been increased by reducing the phase deviations of the output signal S1 and the output signal S2 from the transmission signal S0 (see (a) of FIG. 22). Also, the transmission circuit 600 outputs the transmission signal S0 which has been decreased by increasing the phase deviations of the output signal S1 and the output signal S2 from the transmission signal S0 (see (b) of FIG. 22). In other words, the transmission circuit 600 can control a magnitude of the transmission signal S0 by controlling the phase deviations of the two constant-amplitude signals output by the constant-amplitude wave generating circuit 601.

However, in the conventional transmission circuit 600, since the transmission signal S0 is generated by combining the output signal S1 and the output signal S2, it is difficult to achieve the desired transmission signal S0 if the output signal S1 and the output signal S2 include a phase error or an amplitude error.

Therefore, a conventional transmission circuit called LINC has been disclosed in which a phase error and an amplitude error included in the output signal S1 and the output signal S2 are corrected (see, for example, Japanese Laid-Open Patent Publication No. 5-37263). Hereinafter, Japanese Laid-Open Patent Publication No. 5-37263 is referred to as Patent Document 1. FIG. 23 is a block diagram illustrating a configuration of a conventional transmission circuit 700 disclosed in Patent Document 1. In FIG. 23, the conventional transmission circuit 700 comprises a constant-amplitude wave generating circuit 601, an amplifier 602, an amplifier 603, a combining circuit 604, a phase detector 701, a variable phase shifter 702, an amplitude difference detector 703, and a variable attenuator 704.

In the conventional transmission circuit 700, the phase detector 701 detects a phase error included in an output signal S1 of the amplifier 602. Based on the detected phase error, the variable phase shifter 702 corrects a phase of a constant-amplitude signal generated by the constant-amplitude generating circuit 601. The amplitude difference detector 703 detects an amplitude error included in an output signal S2 of the amplifier 602. Based on the detected amplitude error, the variable attenuator 704 corrects an amplitude of the constant-amplitude signal generated by the constant-amplitude generating circuit 601. Thereby, the conventional transmission circuit 700 can achieve a desired transmission signal S0.

However, the conventional transmission circuit 500 (see FIG. 20) cannot output a transmission signal having an output power smaller than a predetermined output power (i.e., there is a lower limit of the output power of the transmission signal). FIG. 24 is a diagram illustrating exemplary output characteristics of the conventional transmission circuit 500. In FIG. 23, the horizontal axis represents an amplitude signal output from the signal generating section 501, and the vertical axis represents the output power of the transmission signal. As illustrated in FIG. 24, in the conventional transmission circuit 500, it is difficult to cause the amplitude modulation section 504 to perform a linear operation, so that a transmission signal having high linearity cannot be output, in a region in which the output power is small (i.e., a region in which the amplitude signal is small).

In the conventional transmission circuit 600 (see FIG. 21), as described above, since the output signal Si and the output signal S2 having different phases are combined to generate the transmission signal S0, it is difficult to achieve the desired transmission signal S0 due to a phase error or an amplitude error included in the transmission signal SI and the transmission signal S2. Also, in the transmission circuit 600, since the output signal S1 and the output signal S2 having different phases are combined to generate the transmission signal S0, a high-efficiency operation cannot be necessarily achieved, depending on the magnitude of the output power.

In the conventional transmission circuit 700 (see FIG. 23), a number of parts (e.g., the phase detector 701, the variable phase shifter 702, the amplitude difference detector 703, and the variable attenuator 704) are required to correct a phase error or an amplitude error included in the output signal S1 and the output signal S2. Therefore, the conventional transmission circuit 700 unavoidably has a large circuit scale. Also, in the conventional transmission circuit 700, since the output of each of the amplifier 602 and the amplifier 603 is branched, the branching causes a loss, so that the power consumption of the transmission circuit increases.

SUMMARY OF THE INVENTION

Therefore, an object of the present invention is to provide a small-size transmission circuit which outputs a transmission signal having high linearity independently of the magnitude of the output power, and operates with high efficiency, and a communication apparatus employing the transmission circuit.

The present invention is directed to a transmission circuit for generating and outputting a transmission signal based on input data. To achieve the object, the transmission circuit of the present invention comprises a signal generating section, a computation section, a regulator, a first angle modulation section, a first amplitude modulation section, a second angle modulation section, a second amplitude modulation section, and a combining section.

The signal generating section modulates the input data to generate data in a predetermined format. The computation section computes the data generated by the signal generating section to output an amplitude signal, a first phase signal, and a second phase signal. The regulator outputs a signal controlled depending on the amplitude signal. The first angle modulation section angle-modulates the first phase signal and outputs the result as a first angle-modulated signal. The first amplitude modulation section amplitude-modulates the first angle-modulated signal using the signal output from the regulator, and outputs the resultant angle-modulated and amplitude-modulated signal as a first modulated signal. The second angle modulation section for angle-modulating the second phase signal, and outputs the result as a second angle-modulated signal. The second amplitude modulation section amplitude-modulates the second angle-modulated signal using the signal output from the regulator, and outputs the resultant angle-modulated and amplitude-modulated signal as a second modulated signal. The combining section combines the first modulated signal and the second modulated signal and outputs the result as the transmission signal.

Preferably, the computation section calculates an amplitude component and a phase component of the data generated by the signal generating section, compares a magnitude of the amplitude component with a predetermined amplitude threshold value, and if the magnitude of the amplitude component is larger than the predetermined amplitude threshold value, outputs an amplitude signal obtained by multiplying the magnitude of the amplitude component by a predetermined constant, the first phase signal corresponding to the phase component, and the second phase signal corresponding to the phase component, and if the magnitude of the amplitude component is smaller than the predetermined amplitude threshold value, outputs an amplitude signal obtained by multiplying the predetermined amplitude threshold value by a predetermined constant, a first phase signal obtained by shifting the phase component by a predetermined phase in one direction, and a second phase signal obtained by shifting the phase component by a predetermined phase in another direction.

Transmission power information indicating a magnitude of an output power of the transmission signal every a predetermined time is input. In this case, the computation section changes a magnitude of the predetermined amplitude threshold value every the predetermined time so that a relationship between the magnitude of the predetermined amplitude threshold value and the magnitude of the output power indicated by the transmission power information has inverse characteristics. The transmission circuit further comprises a variable gain amplification section for amplifying the amplitude signal using a gain based on the transmission power information. The variable gain amplification section changes a magnitude of the gain for amplifying the amplitude signal every the predetermined time so that a relationship between the magnitude of the gain for amplifying the amplitude signal and the magnitude of the output power indicated by the transmission power information has direct characteristics.

Preferably, the computation section changes the magnitude of the amplitude threshold value so that the magnitude of the amplitude threshold value is inversely proportional to a magnitude of the square root of the output power indicated by the transmission power information. Specifically, the computation section changes the magnitude of the amplitude threshold value, depending on the magnitude of the output power indicated by the transmission power information, with reference to a lookup table in which an optimal value is previously set.

Preferably, the variable gain amplification section changes the magnitude of the gain for amplifying the amplitude signal so that the magnitude of the gain for amplifying the amplitude signal is directly proportional to a magnitude of the square root of the output power indicated by the transmission power information. Specifically, the variable gain amplification section changes the magnitude of the gain for amplifying the amplitude signal, depending on the magnitude of the output power indicated by the transmission power information, with reference to a lookup table in which an optimal value is previously set.

The predetermined phase is obtained by calculating the arc cosine of a value obtained by dividing the magnitude of the amplitude component by the predetermined amplitude threshold value.

Preferably, the regulator is a switching regulator. Alternatively, the regulator may be a series regulator. Alternatively, the regulator may be composed of a switching regulator and a series regulator which are connected in series.

The transmission circuit may further comprise a predistortion compensating section for compensating for at least any one of the amplitude signal, the first phase signal, and the second phase signal so that a distortion occurring in at least any one of the first angle modulation section, the second angle modulation section, the first amplitude modulation section, the second amplitude modulation section, and the regulator is suppressed. In this case, the predistortion compensating section is provided at an output of the computation section.

Preferably, the computation section compares the magnitude of the amplitude component with the predetermined amplitude threshold value every a predetermined interval. The computation section, when the number of sampling points at which the magnitude of the amplitude component exceeds the predetermined amplitude threshold value is larger than or equal to a predetermined number during the predetermined interval, outputs an amplitude signal obtained by multiplying the magnitude of the amplitude component by a predetermined constant, the first phase signal corresponding to the phase component, and the second phase signal corresponding to the phase component, and when the number of sampling points at which the magnitude of the amplitude component exceeds the predetermined amplitude threshold value is smaller than the predetermined number during the predetermined interval, outputs an amplitude signal obtained by multiplying the predetermined amplitude threshold value by a predetermined constant, a first phase signal obtained by shifting the phase component by a predetermined phase in one direction, and a second phase signal obtained by shifting the phase component by a predetermined phase in another direction.

The computation section may change a length of the predetermined interval, depending on a change width of an envelope of the transmission signal. More specifically, the computation section, when the change width of the envelope of the transmission signal is small, decreases the predetermined interval, and when the change width of the envelope of the transmission signal is large, increases the predetermined interval.

When transmission power information indicating a magnitude of an output power of the transmission signal every a predetermined time is input, the computation section calculates an amplitude component and a phase component of the data generated by the signal generating section, compares the magnitude of the transmission power information with a magnitude of a predetermined power threshold value every the predetermined time, and if the magnitude of the transmission power information is larger than the predetermined power threshold value, outputs an amplitude signal obtained by multiplying the magnitude of the amplitude component by a predetermined constant, the first phase signal corresponding to the phase component, and the second phase signal corresponding to the phase component, and if the magnitude of the transmission power information is smaller than the predetermined amplitude threshold value, outputs an amplitude signal obtained by multiplying the predetermined power threshold value by a predetermined constant, a first phase signal obtained by shifting the phase component by a predetermined phase in one direction, and a second phase signal obtained by shifting the phase component by a predetermined phase in another direction.

The present invention is also directed to a communication apparatus comprising the above-described transmission circuit. The communication apparatus comprises the transmission circuit for generating a transmission signal, and an antenna for outputting the transmission signal generated by the transmission circuit. The communication apparatus may further comprise a reception circuit for processing a reception signal received from the antenna, and an antenna duplexer for outputting the transmission signal generated by the transmission circuit to the antenna, and outputting the reception signal received from the antenna to the reception circuit.

As described above, according to the present invention, the computation section, when the magnitude of the amplitude component of the input data is larger than the predetermined amplitude threshold value, outputs an amplitude signal obtained by multiplying the magnitude of the amplitude component of the input data by a predetermined constant, the first phase signal corresponding to the phase component of the input data, and the second phase signal corresponding to the phase component of the input data. Therefore, the transmission circuit 1, when the magnitude of the amplitude component of the input data is larger than the predetermined amplitude threshold value, can combine the first modulated signal and the second modulated signal whose amplitudes vary depending on the amplitude signal and whose phases are the same, and output the combined signal as the transmission signal.

Also, the computation section, when the magnitude of the amplitude component of the input data is smaller than the predetermined amplitude threshold value, outputs an amplitude signal obtained by multiplying the predetermined amplitude threshold value by a predetermined constant, a first phase signal obtained by shifting the phase component of the input data by a predetermined phase in one direction, and a second phase signal obtained by shifting the phase component of the input data by a predetermined phase in another direction. Therefore, the transmission circuit, when the magnitude of the amplitude component of the input data is smaller than the predetermined amplitude threshold value, can combine the first modulated signal and the second modulated signal whose magnitudes are the same and whose phases are different from each other, and output the combined signal as the transmission signal. Thereby, the transmission circuit can output a transmission signal having high linearity with high efficiency, independently of the magnitude of an output power varying depending on the magnitude of the amplitude component of the input data.

Also, the transmission circuit does not branch output signals of the first amplitude modulation section and the second amplitude modulation section, thereby making it possible to suppress a loss accompanying signal branching, resulting in a reduction in power consumption for a transmission circuit.

Also, the transmission circuit changes the magnitude of the predetermined amplitude threshold value so that the magnitude of the predetermined amplitude threshold value has inverse characteristics with respect to the magnitude of the output power indicated by the input transmission power information, and amplifies the amplitude signal output by the computation section using a gain which has direct characteristics with respect to the magnitude of the output power indicated by the transmission power information. Thereby, the transmission circuit can output a transmission signal having high linearity with high efficiency even when the magnitude of the output power indicated by the transmission power information varies.

Also, according to the communication apparatus of the present invention, by employing the above-described transmission circuit, a small size and a high-efficiency operation can be achieved while securing the accuracy of an output signal over a wide bandwidth.

These and other objects, features, aspects and advantages of the present invention will become more apparent from the following detailed description of the present invention when taken in conjunction with the accompanying drawings.

BRIEF DESCRIPTION OF THE DRAWINGS

FIG. 7 is a diagram showing the result of simulation by which gain errors and phase errors were obtained with respect to the adjacent channel leakage power ACP when DR is 6 dB;

FIG. 9A is a block diagram illustrating a configuration of a series regulator 17a;

FIG. 10A is a block diagram illustrating an exemplary configuration of an amplitude modulation section 15a;

FIG. 13A is a diagram illustrating exemplary amplitude threshold values set in a lookup table;

FIG. 13B is a diagram illustrating exemplary gains set in a lookup table;

FIG. 18C is a block diagram illustrating an exemplary configuration of a transmission circuit 3a according to the third embodiment which comprises the predistortion compensating section 21

DESCRIPTION OF THE PREFERRED EMBODIMENTS

First Embodiment

Figure 1A:
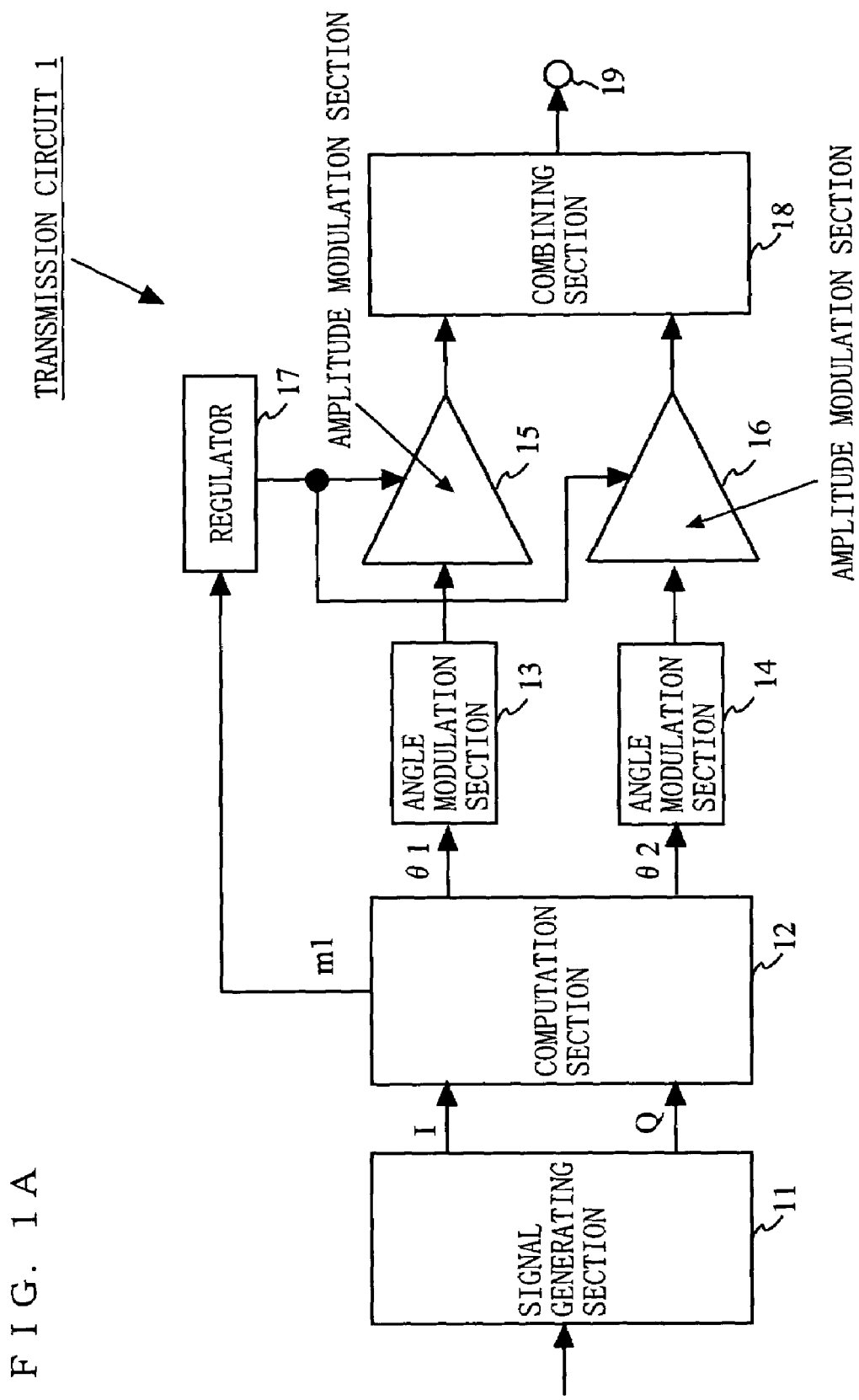
FIG. 1A is a block diagram illustrating an exemplary configuration of a transmission circuit 1 according to a first embodiment of the present invention.

FIG. 1A is a block diagram illustrating an exemplary configuration of a transmission circuit 1 according to a first embodiment of the present invention. In FIG. 1A, the transmission circuit 1 comprises a signal generating section 11, a computation section 12, an angle modulation section 13, an angle modulation section 14, an amplitude modulation section 15, an amplitude modulation section 16, a regulator 17, a combining section 18, and an output terminal 19.

The signal generating section 11 modulates input data to generate data in a predetermined format. Specifically, the signal generating section 11 generates an in-phase signal and a quadrature-phase signal (hereinafter, such an in-phase signal and a quadrature-phase signal will be referred to as "I and Q signals"), which are quadrature signals. Note that the signal generating section 11 may generate, for example, data including an amplitude component and a phase component as the data in the predetermined format. The I and Q signals generated by the signal generating section 11 are input to the computation section 12. The computation section 12 performs a predetermined computation process based on the I and Q signals to generate an amplitude signal m1(t), a first phase signal θ1(t), and a second phase signal θ2(t). A specific computation process of the computation section 12 will be described below. The amplitude signal m1(t) is input to the regulator 17. The regulator 17 outputs a signal which is controlled based on the amplitude signal m1(t). The signal output by the regulator 17 is input to the amplitude modulation section 15 and the amplitude modulation section 16.

The first phase signal θ1(t) is input to the angle modulation section 13. The angle modulation section 13 angle-modulates the first phase signal θ1(t) and outputs the result as a first angle-modulated signal. The first angle-modulated signal is input to the amplitude modulation section 15. The amplitude modulation section 15 amplitude-modulates the first angle-modulated signal using the signal input from the regulator 17 and outputs the resultant angle-modulated and amplitude-modulated signal as a first modulated signal. The first modulated signal is input to the combining section 18.

The second phase signal θ2(t) is input to the angle modulation section 14. The angle modulation section 14 angle-modulates the second phase signal θ2(t) and outputs the result as a second angle-modulated signal. The second angle-modulated signal is input to the amplitude modulation section 16. The amplitude modulation section 16 amplitude-modulates the second angle-modulated signal using the signal input from the regulator 17 and outputs the resultant angle-modulated and amplitude-modulated signal as a second modulated signal. The second modulated signal is input to the combining section 18. The combining section 18 combines the first modulated signal and the second modulated signal and outputs the result as a transmission signal. The transmission signal is output from the output terminal 19.

Figure 1B:
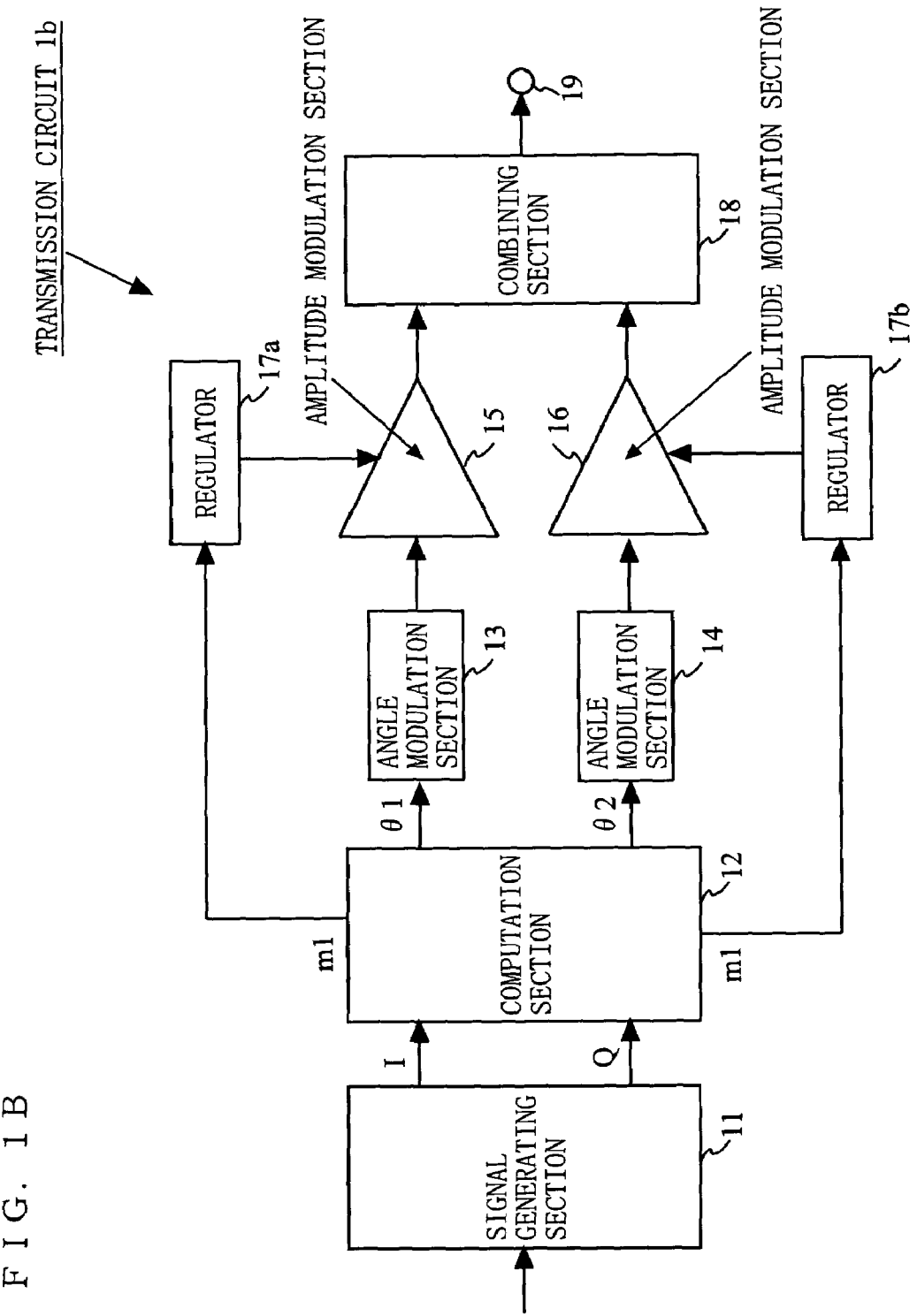
FIG. 1B is a block diagram illustrating an exemplary configuration of a transmission circuit 1b of the first embodiment of the present invention.

Note that, in the transmission circuit 1 of FIG. 1A, a signal is supplied to the amplitude modulation section 15 and the amplitude modulation section 16 from the regulator 17 which is shared by the two sections. Alternatively, as illustrated in FIG. 1B, signals may be supplied from separate regulators to the amplitude modulation section 15 and the amplitude modulation section 16.

Figure 2:
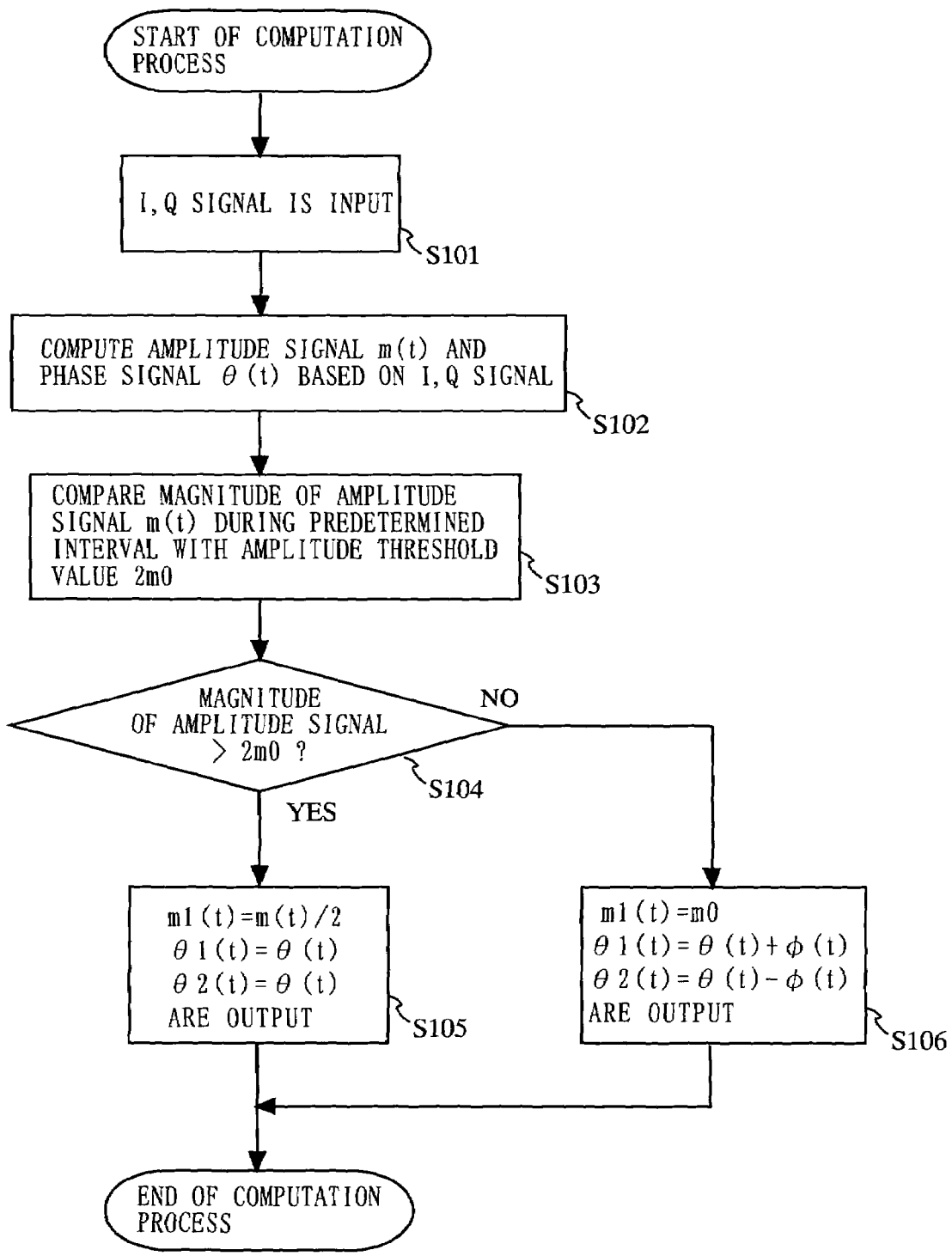
FIG. 2 is a flowchart of an exemplary operation of a computation section 12 of the first embodiment of the present invention.

FIG. 2 is a flowchart of an exemplary operation of the computation section 12 of the first embodiment of the present invention. Referring to FIG. 2, I and Q signals are input from the signal generating section 11 to the computation section 12 (step S101). The computation section 12 generates the amplitude signal m(t) from the I and Q signals by a computation process represented by expression (1). In other words, the computation section 12 generates the amplitude signal m(t) corresponding to an amplitude component of the input data. The computation section 12 also generates a phase signal θ(t) from the I and Q signals by a computation process represented by expression (2) (step S102) In other words, the computation section 12 generates a phase signal θ(t) corresponding to a phase component of the input data.

$$m(t) = \sqrt{I(t)^2 + Q(t)^2} \tag{1}$$

$$\theta(t) = \arg(I(t) + jQ(t)) = \tan^{-1}(Q(t)/I(t)) \tag{2}$$

The computation section 12 compares a magnitude of the amplitude signal m(t) during a predetermined interval with a predetermined amplitude threshold value 2m0 (step S103). Here, the predetermined interval is a sampling interval for the amplitude signal m(t). When the magnitude of the amplitude signal m(t) during the predetermined interval is larger than the predetermined amplitude threshold value 2m0, the computation section 12 outputs an amplitude signal m1(t), a first phase signal θ1(t), and a second phase signal θ2(t) represented by expressions (3) to (5), respectively (steps S104 and S105).

$$m1(t) = \frac{m(t)}{2} \tag{3}$$

$$\theta1(t)=\theta(t) \tag{4}$$

$$\theta2(t)=\theta(t) \tag{5}$$

On the other hand, when the magnitude of the amplitude signal m(t) during the predetermined interval is smaller than the predetermined amplitude threshold value 2m0, the computation section 12 outputs an amplitude signal m1(t), a first phase signal θ1(t), and a second phase signal θ2(t) represented by expressions (6) to (8) (steps S104 and S106). Note that φ(t) is obtained by expression (9).

$$m1(t)=m0 \tag{6}$$

$$\theta1(t)=\theta(t)+\phi(t) \tag{7}$$

$$\theta2(t)=\theta(t)-\phi(t) \tag{8}$$

$$\phi(t) = \cos^{-1}\left[\frac{m(t)}{2m0}\right] \tag{9}$$

Note that, if a ratio of the amplitude signal m1(t) which is output when the magnitude of the amplitude signal m(t) during the predetermined interval is larger than the predetermined amplitude threshold value 2m0, to the amplitude signal m1(t) which is output when the magnitude of the amplitude signal m(t) during the predetermined interval is smaller than the predetermined amplitude threshold value 2m0, is the same, the computation section 12 may outputs an amplitude signal m1(t) having a magnitude other than those represented by expressions (3) and (6). This is because the amplitude signal m1(t) is multiplied by a constant in the regulator 17. Specifically, when the magnitude of the amplitude signal m(t) during the predetermined interval is larger than the predetermined amplitude threshold value 2m0, the computation section 12 may output an amplitude signal m1(t) which is obtained by multiplying the magnitude of the amplitude signal m(t) by A (A: an arbitrary constant). When the magnitude of the amplitude signal m(t) during the predetermined interval is smaller than the predetermined amplitude threshold value 2m0, the computation section 12 may output an amplitude signal m1(t) which is obtained by multiplying a magnitude of the amplitude threshold value 2m0 by A.

Although that the predetermined interval is assumed to be the sampling interval in the above description, the predetermined interval may be an interval including a plurality of sampling intervals. In such a case, the computation section 12 determines a signal to be output, depending on the number of sampling points which exceed the predetermined amplitude threshold value during the predetermined interval. For example, when the number of sampling points which exceed the predetermined amplitude threshold value during the predetermined interval is larger than or equal to a predetermined number, the computation section 12 outputs the amplitude signal m1(t), the first phase signal θ1(t), and the second phase signal θ2(t) represented by expressions (3) to (5). Here, the predetermined number is any integer of 1 or more. On the other hand, when the number of sampling points which exceed the predetermined amplitude threshold value during the predetermined interval is smaller than the predetermined number, the computation section 12 outputs the amplitude signal m1(t), the first phase signal θ1(t), and the second phase signal θ2(t) represented by expressions (6) to (8). Note that φ(t) is obtained by expression (9).

Figure 3A:
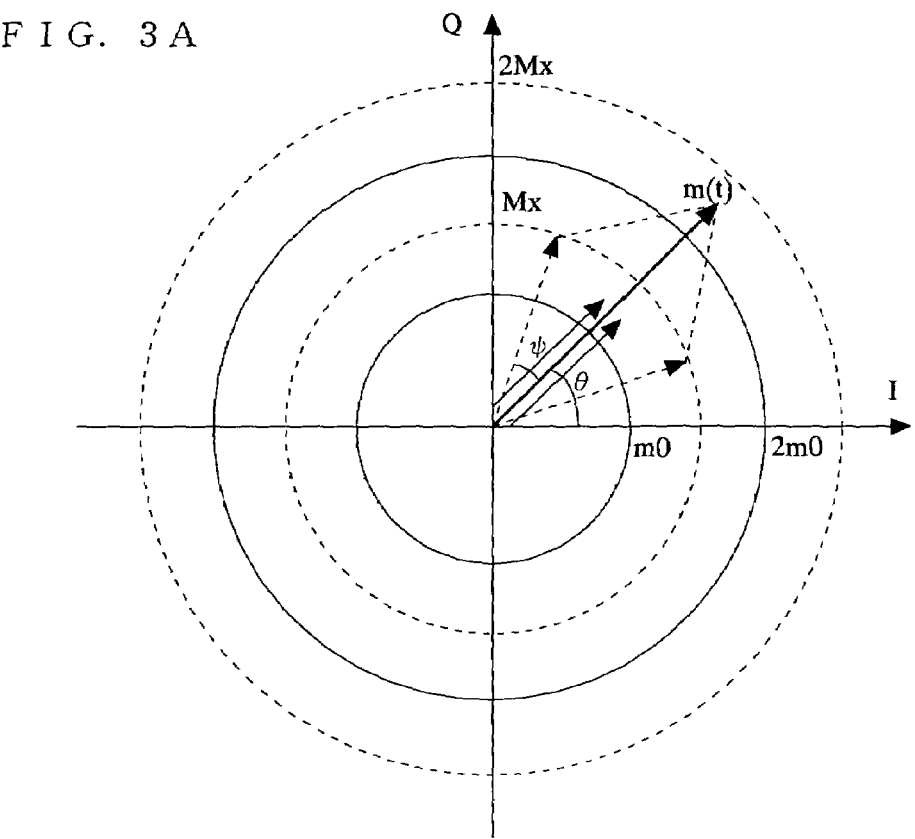
FIG. 3A is a diagram for describing an operation of the transmission circuit 1 when a magnitude of an amplitude signal m(t) during a predetermined interval is larger than a predetermined amplitude threshold value 2m0.
Figure 3B:
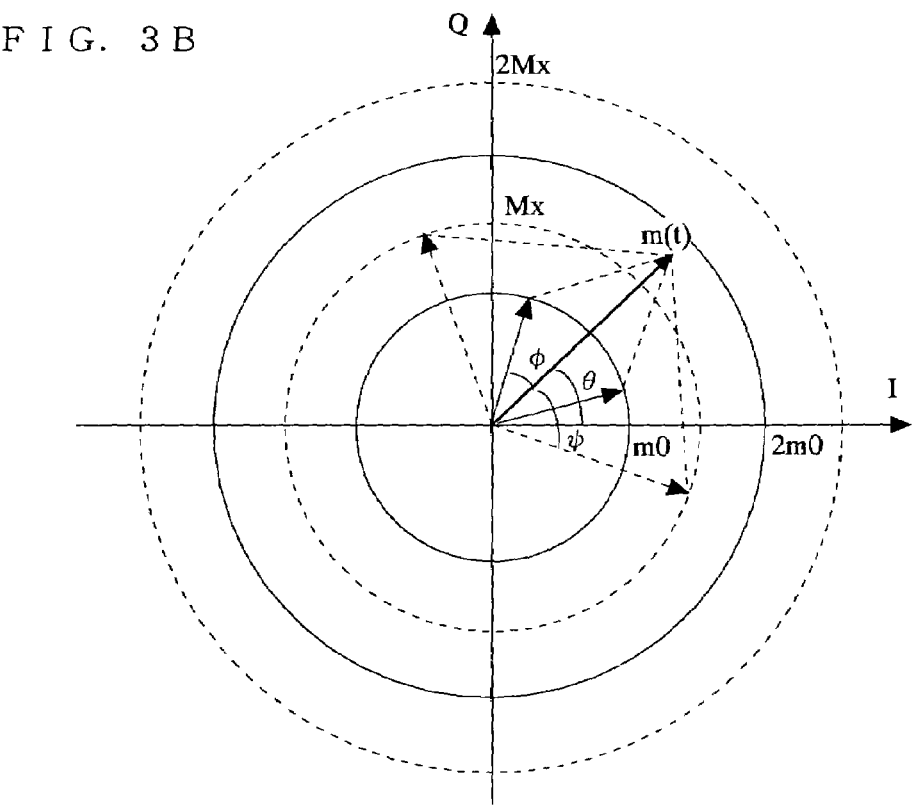
FIG. 3B is a diagram for describing an operation of the transmission circuit 1 when the magnitude of the amplitude signal m(t) during the predetermined interval is smaller than the predetermined amplitude threshold value 2m0.

Next, a difference between the transmission circuit 1 of the first embodiment and the conventional transmission circuits called LINC will be described with reference to FIGS. 3A and 3B. FIG. 3A is a diagram for describing an operation of the transmission circuit 1 when the magnitude of the amplitude signal m(t) during the predetermined interval is larger than the predetermined amplitude threshold value 2m0. FIG. 3B is a diagram for describing an operation of the transmission circuit 1 when the magnitude of the amplitude signal m(t) during the predetermined interval is smaller than the predetermined amplitude threshold value 2m0.

In FIGS. 3A and 3B, a large circle represented by a solid line indicates a range of the magnitude of the predetermined amplitude threshold value 2m0, and a small circle represented by a solid line indicates a range of a magnitude m0 which is half of the predetermined amplitude threshold value 2m0. Also, a large circle represented by a dashed line indicates a range of a magnitude of a maximum amplitude 2Mx (hereinafter referred to as a total maximum amplitude 2Mx) of the amplitude signal m(t) in the entire interval. A small circle represented by a dashed line indicates a range of a magnitude Mx which is half of the total maximum amplitude 2Mx.

Referring to FIG. 3A, a relationship between the amplitude signal m(t) and the phase signal θ(t) represented by expressions (1) and (2) is indicated by a signal represented by a long solid-line arrow. Also, a relationship between the amplitude signal m1(t), the first phase signal θ1(t) and the second phase signal θ2(t) represented by expressions (3) to (5) is indicated by two signals represented by short solid-line arrows. Although the two signals represented by the short solid-line arrows actually overlap, the two signals are illustrated, being shifted from the origin so as to be clearly seen for the sake of convenience. In other words, when the magnitude of the amplitude signal m(t) during the predetermined interval is larger than the predetermined amplitude threshold value 2m0, the transmission circuit 1 combines two signals having the same magnitude and phase.

On the other hand, in the conventional transmission circuit called LINC, two signals which are present in the range of the magnitude Mx which is half of the total maximum amplitude 2Mx, and have phases differing by ±ψ (i.e., signals represented by dashed-line arrows) are combined. Note that ψ(t) can be represented by expression (13). In other words, when the magnitude of the amplitude signal m(t) during the predetermined interval is larger than the predetermined amplitude threshold value 2m0, the transmission circuit 1 combines two signal having the same magnitude and phase, and therefore, can operate with higher efficiency than that of the conventional LINC which combines two signals having phases differing by ±ψ.

Referring to FIG. 3B, a relationship between the amplitude signal m(t) and the phase signal θ(t) represented by expressions (1) and (2) is indicated by a signal represented by a long solid-line arrow. Also, a relationship between the amplitude signal m1(t), the first phase signal θ1(t) and the second phase signal θ2(t) represented by expressions (6) to (8) is indicated by two signals represented by short solid-line arrows. In other words, when the magnitude of the amplitude signal m(t) during the predetermined interval is smaller than the predetermined amplitude threshold value 2m0, the transmission circuit 1 combines two signals which have the same magnitude and have phases differing ±φ(t).

On the other hand, in the conventional transmission circuit called LINC, two signals which are present in the range of the magnitude Mx which is half of the total maximum amplitude 2Mx, and have phases differing by ±Ω (i.e., signals represented by dashed-line arrows) are combined. Note that ψ(t) can be represented by expression (13). Here, when φ(t) is compared with ψ(t), a relationship ψ(t)≧φ(t) is established since Mx≧m0. In other words, when the magnitude of the amplitude signal m(t) during the predetermined interval is smaller than the predetermined amplitude threshold value 2m0, the transmission circuit 1 combines two signals which have the same magnitude and phases differing by ±φ(t), and therefore, can operate with higher efficiency than that of the conventional LINC which combines two signals having phases differing by ±ψ.

Figure 4:
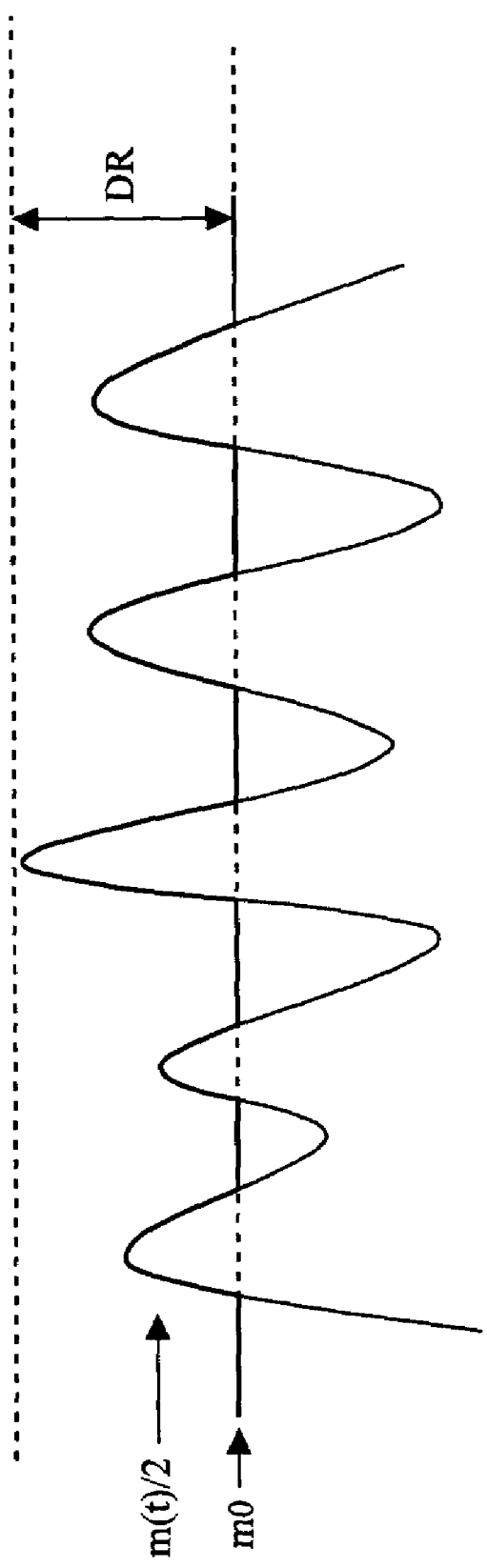
FIG. 4 is a diagram illustrating an exemplary waveform of the amplitude signal m1(t) output by the computation section 12.
Figure 5:
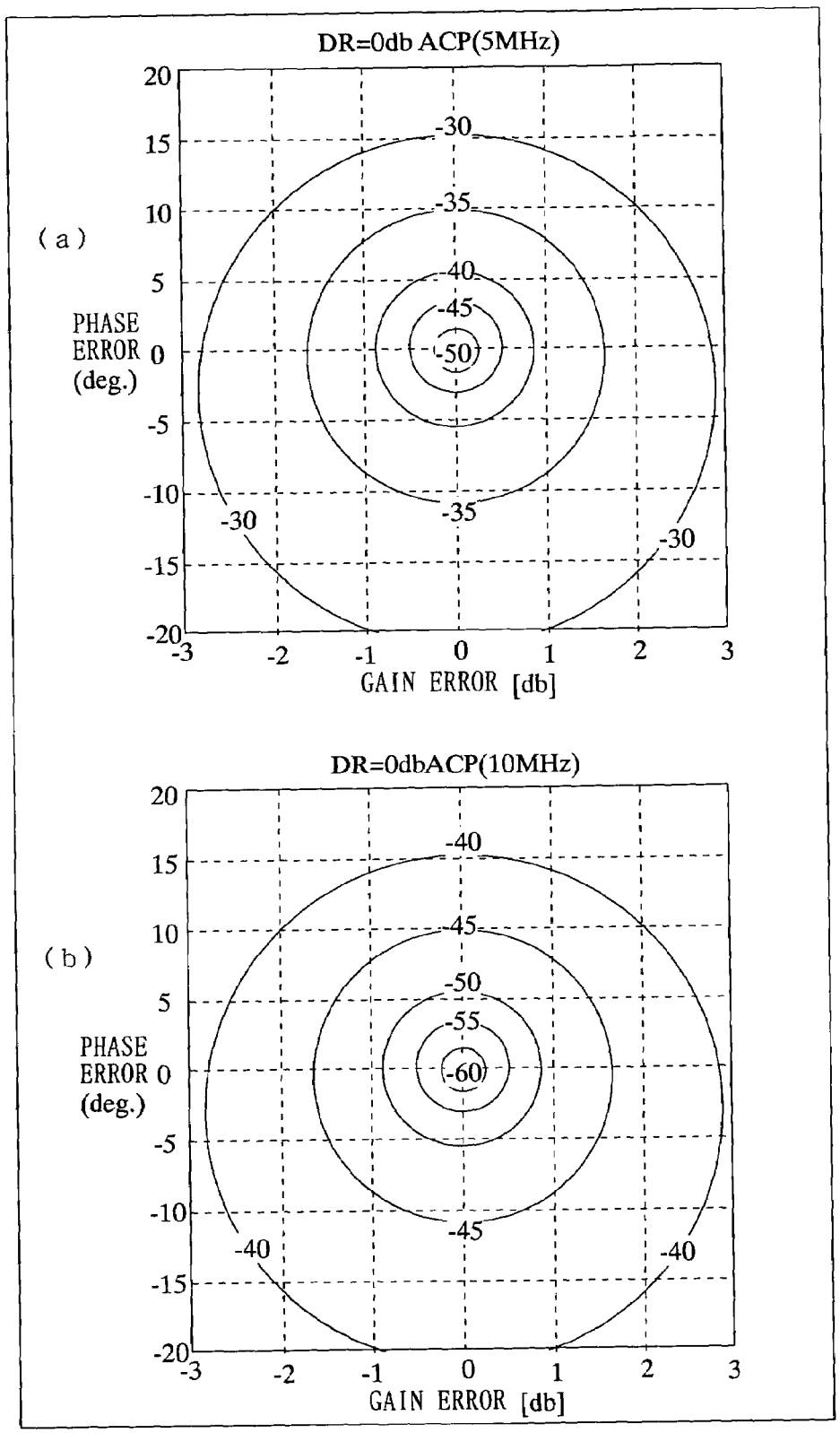
FIG. 5 is a diagram showing the result of simulation by which gain errors and phase errors were obtained with respect to an adjacent channel leakage power ACP when DR is 0 dB.
Figure 6:
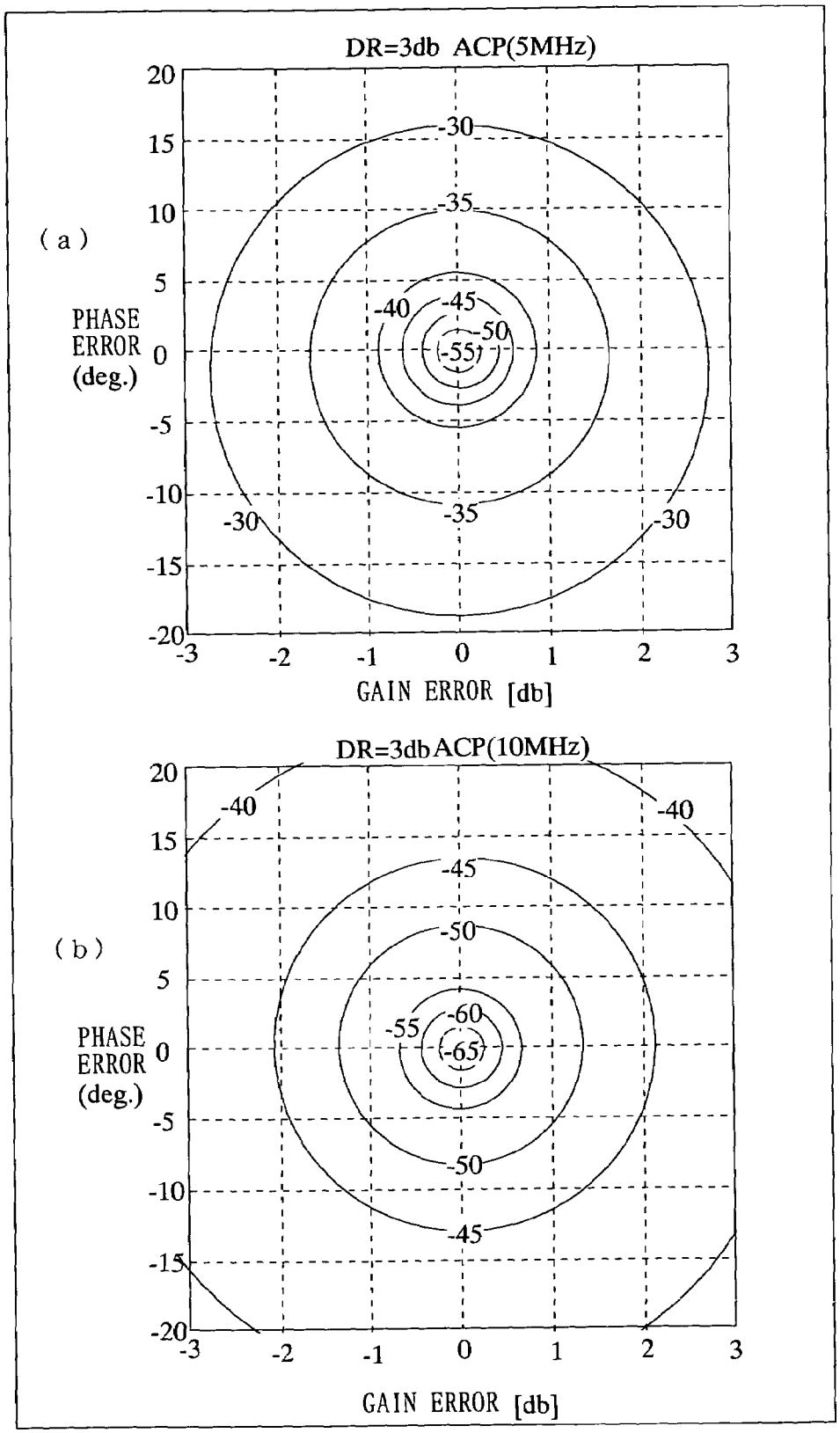
FIG. 6 is a diagram showing the result of simulation by which gain errors and phase errors were obtained with respect to the adjacent channel leakage power ACP when DR is 3 dB.
Figure 8:
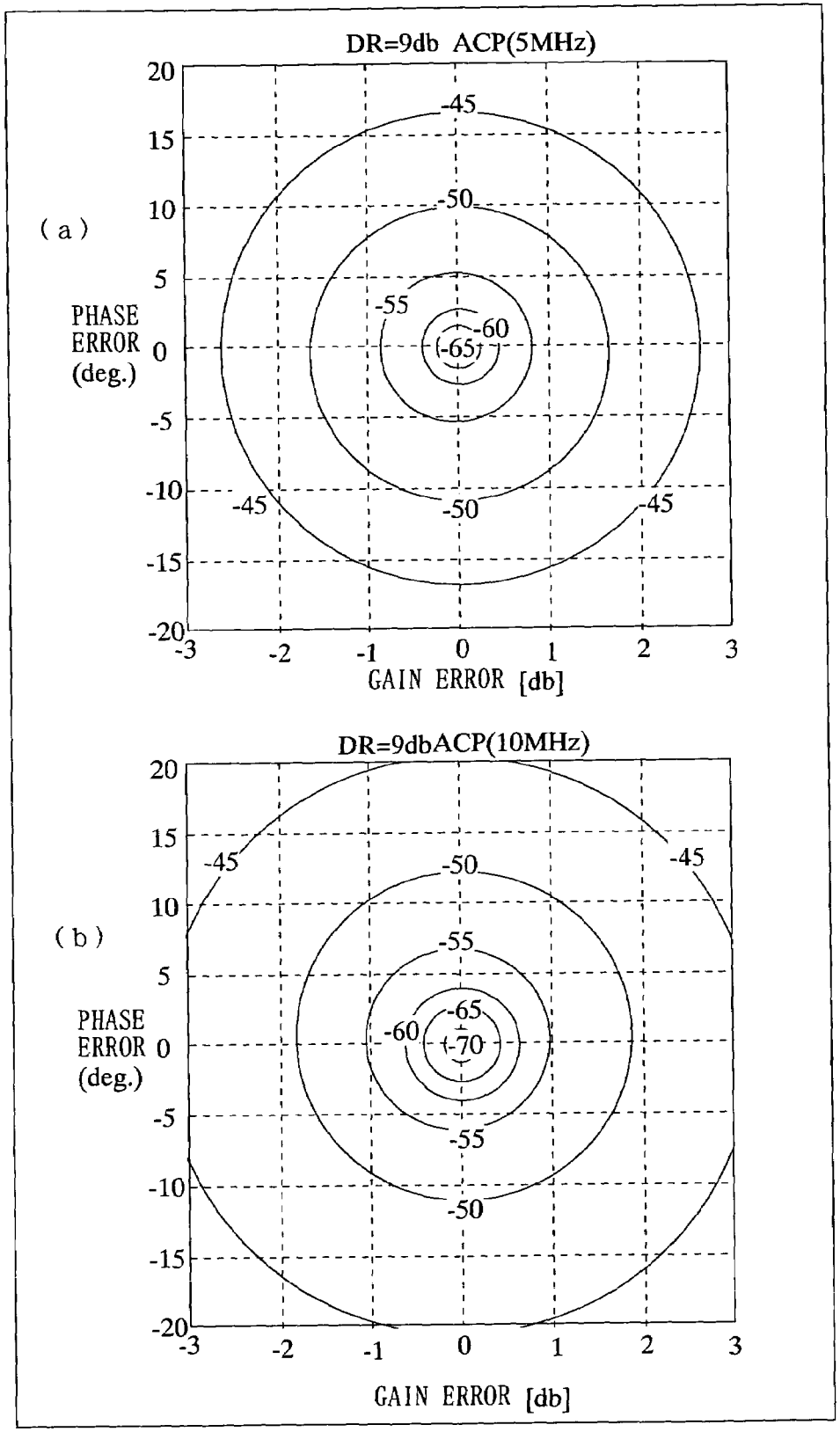
FIG. 8 is a diagram showing the result of simulation by which gain errors and phase errors were obtained with respect to the adjacent channel leakage power ACP when DR is 9 dB.

FIG. 4 is a diagram illustrating an exemplary waveform of the amplitude signal m1(t) output by the computation section 12. Referring to FIG. 4, when the magnitude of the amplitude signal m(t) during the predetermined interval is larger than the predetermined amplitude threshold value 2m0, the computation section 12 outputs the amplitude signal m(t)/2 which depends on a magnitude of an envelope of the transmission signal, as represented by expression (3). On the other hand, when the magnitude of the amplitude signal m(t) during the predetermined interval is smaller than the predetermined amplitude threshold value 2m0, the computation section 12 outputs an amplitude signal m0 having a constant magnitude, as represented by expression (5). Here, a difference between the magnitude of the amplitude signal m(t)/2 and the magnitude of the amplitude signal m0 during the predetermined interval (i.e., a magnitude of a dynamic range of the amplitude signal m1(t)) is represented by DR.

FIGS. 5 to 8 are diagrams showing the results of simulation by which gain errors and phase errors were obtained with respect to an adjacent channel leakage power ACP when DR is changed from 0 dB to 9 dB. Circles of FIGS. 5 to 8 represent magnitudes of the amplitude signal m0. As shown in FIGS. 5 to 8, as DR is increased, the gain error and phase error obtained with respect to the adjacent channel leakage power ACP are relaxed. In other words, in the transmission circuit 1, as DR is increased, the amplitude signal m0 can be reduced.

Figure 9A:
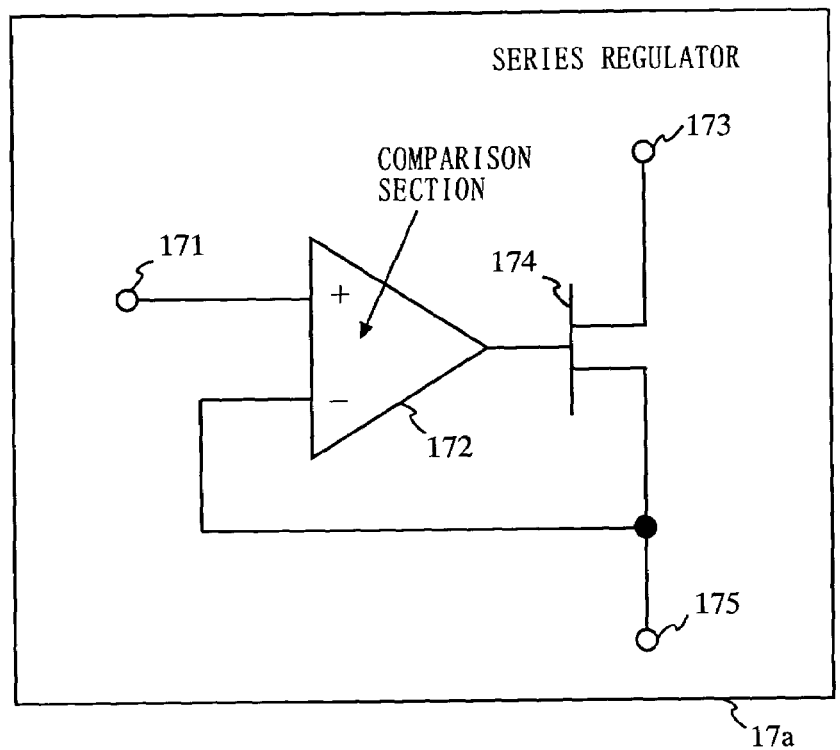

Next, the regulator 17, the amplitude modulation sections 15 and 16, and the combining section 18 will be described in detail. The regulator 17 can be composed of, for example, a voltage drive type series regulator. FIG. 9A is a block diagram illustrating a configuration of a series regulator 17a. In FIG. 9A, the series regulator 17a includes an input terminal 171, a comparison section 172, a power supply terminal 173, a transistor 174, and an output terminal 175. It is here assumed that the transistor 174 is a field effect transistor. The amplitude signal m1(t) is input from the computation section 12 to the input terminal 171. The amplitude signal m1(t) is input via the comparison section 172 to the gate terminal of the transistor 174. A direct-current voltage is supplied from the power supply terminal 173 to the drain terminal of the transistor 174. The transistor 174 outputs a voltage proportional to the input amplitude signal m1(t) from the source terminal thereof. The voltage output from the source terminal of the transistor 174 is fed back to the comparison section 172. Based the voltage thus fed back, the comparison section 172 adjusts the magnitude of the amplitude signal m1(t) to be input to the gate terminal of the transistor 174. Thus, the series regulator 17a can stably supply the voltage which is controlled depending on the amplitude signal m1(t), from the output terminal 175. Note that the transistor 174 may be a bipolar transistor.

Figure 9B:
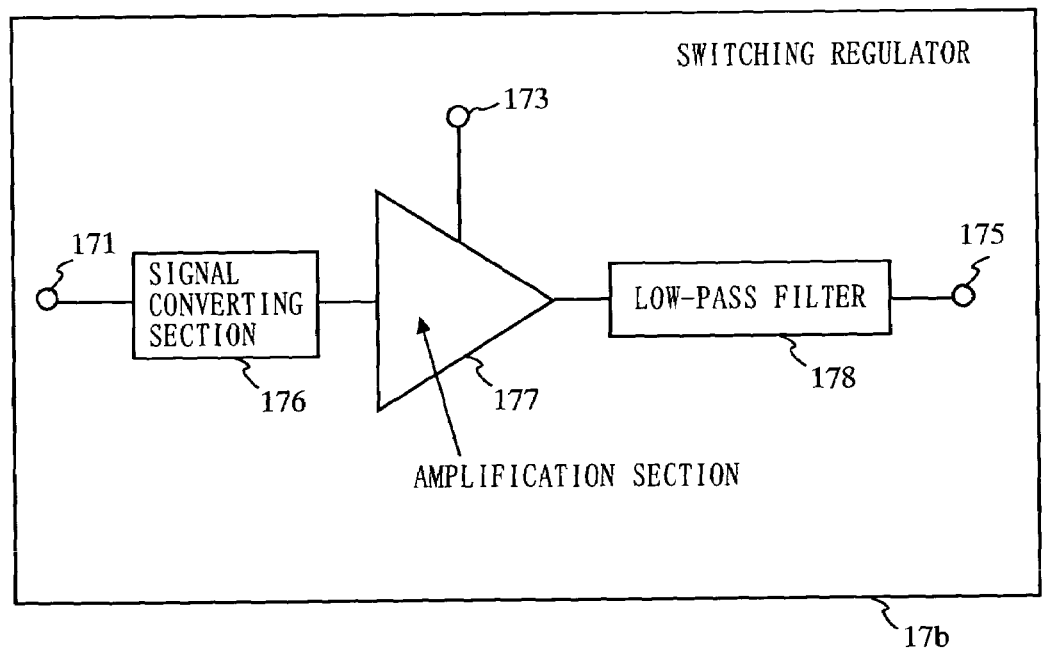
FIG. 9B is a block diagram illustrating an exemplary configuration of a switching regulator 17b.

Alternatively, the regulator 17 is composed of, for example, a voltage drive type switching regulator. FIG. 9B is a block diagram illustrating an exemplary configuration of a switching regulator 17b. In FIG. 9B, the switching regulator 17b includes an input terminal 171, a power supply terminal 173, a signal converting section 176, an amplification section 177, a low-pass filter 178, and an output terminal 175. The amplitude signal m1(t) is input from the computation section 12 to the input terminal 171. The amplitude signal m1(t) is input to the signal converting section 176. The signal converting section 176 converts the input amplitude signal m1(t) into a PWM- or delta sigma-modulated signal. The signal converted in the signal converting section 176 is input to the amplification section 177. The amplification section 177 amplifies and outputs the input signal. Note that a direct-current voltage is supplied from the power supply terminal 173 to the amplification section 177. As the amplification section 177, a high-efficiency switching amplifier, such as a class-D amplifier or the like, is employed.

The signal output by the amplification section 177 is input to the low-pass filter 178. The low-pass filter 178 removes spurious components, such as quantization noise, switching noise, and the like, from the signal output by the amplification section 177. The signal obtained by removing the spurious components in the low-pass filter 178 is output as a voltage controlled depending on the amplitude signal m1(t) from the output terminal 175. Note that the switching regulator 17b may feed the signal output from the low-pass filter 178 back to the signal converting section 176 so as to stabilize the voltage to be output. In the transmission circuit 1, power consumption for a transmission circuit can be reduced by using the high-efficiency switching regulator 17b as the regulator 17.

Figure 9C:
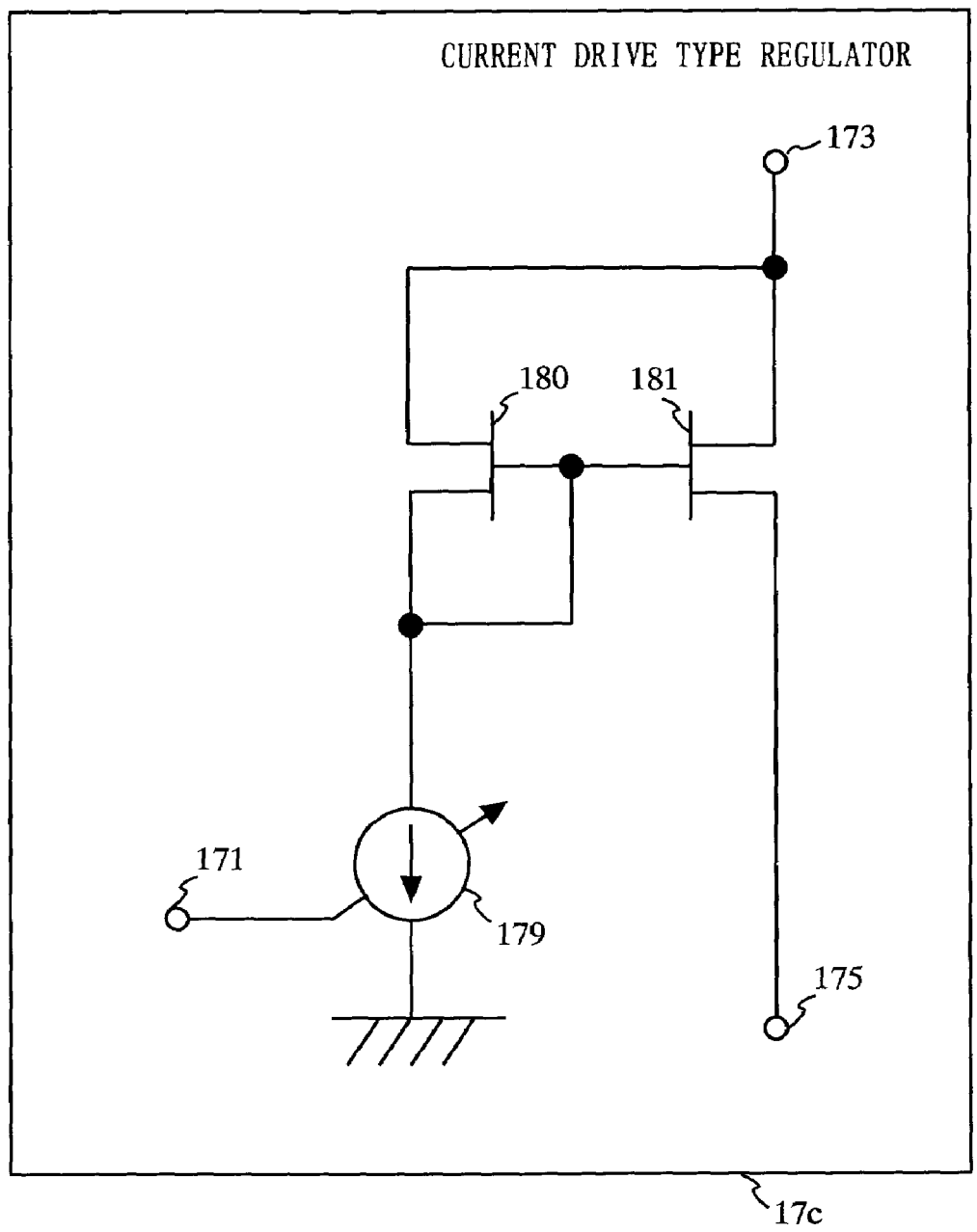
FIG. 9C is a block diagram illustrating an exemplary configuration of a current drive type regulator 17c.

Alternatively, the regulator 17 can be composed of, for example, a current drive type regulator. FIG. 9C is a block diagram illustrating an exemplary configuration of a current drive type regulator 17c. In FIG. 9C, the current drive type regulator 17c includes an input terminal 171, a power supply terminal 173, a variable current source 179, a transistor 180, a transistor 181, and an output terminal 175. The amplitude signal m1(t) is input from the computation section 12 to the input terminal 171. A direct-current voltage is supplied to the power supply terminal 173. The amplitude signal m1(t) input via the input terminal 171 is output as a current controlled depending on the amplitude signal m1(t), from the output terminal 175 via the variable current source 179, the transistor 180 and the transistor 181. Such a current drive type regulator 17c is useful when the amplitude modulation section 15 and the amplitude modulation section 16 are each composed of a bipolar transistor. Note that the transistor 180 and the transistor 181 may be each either a field effect transistor or a bipolar transistor.

Figure 10A:
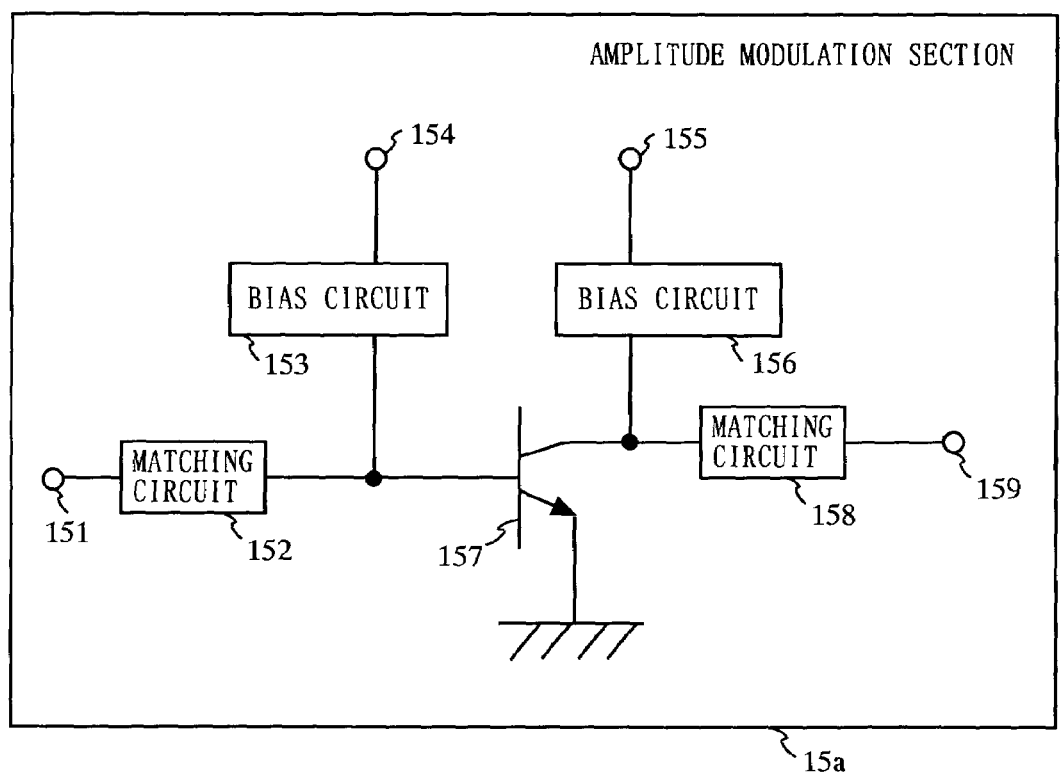

For example, the amplitude modulation section 15 can be composed of, for example, an amplitude modulation section 15a illustrated in FIG. 10A. FIG. 10A is a block diagram illustrating an exemplary configuration of the amplitude modulation section 15a. In FIG. 10A, the amplitude modulation section 15a includes an input terminal 151, a matching circuit 152, a bias circuit 153, a power supply terminal 154, an input terminal 155, a bias circuit 156, a transistor 157, a matching circuit 158, and an output terminal 159. It is here assumed that the transistor 157 is a bipolar transistor. The first angle-modulated signal is input from the angle modulation section 13 to the input terminal 151. The first angle-modulated signal is input via the matching circuit 152 to the base terminal of the transistor 157.

Also, a direct-current voltage is applied to the power supply terminal 154. Specifically, a bias voltage is supplied via the bias circuit 153 to the base terminal of the transistor 157. The signal controlled depending on the magnitude of the amplitude signal m1(t) is input from the regulator 17 to the input terminal 155. The signal controlled depending on the magnitude of the amplitude signal is input via the bias circuit 156 to the collector terminal of the transistor 157. The transistor 157 amplitude-modulates the first angle-modulated signal using the signal controlled depending on the magnitude of the amplitude signal m1(t), and outputs the result as an angle-modulated and amplitude-modulated signal. The modulated signal output from the transistor 157 is output via the matching circuit 158 from the output terminal 159. Note that the transistor 157 may be a field effect transistor.

Figure 10B:
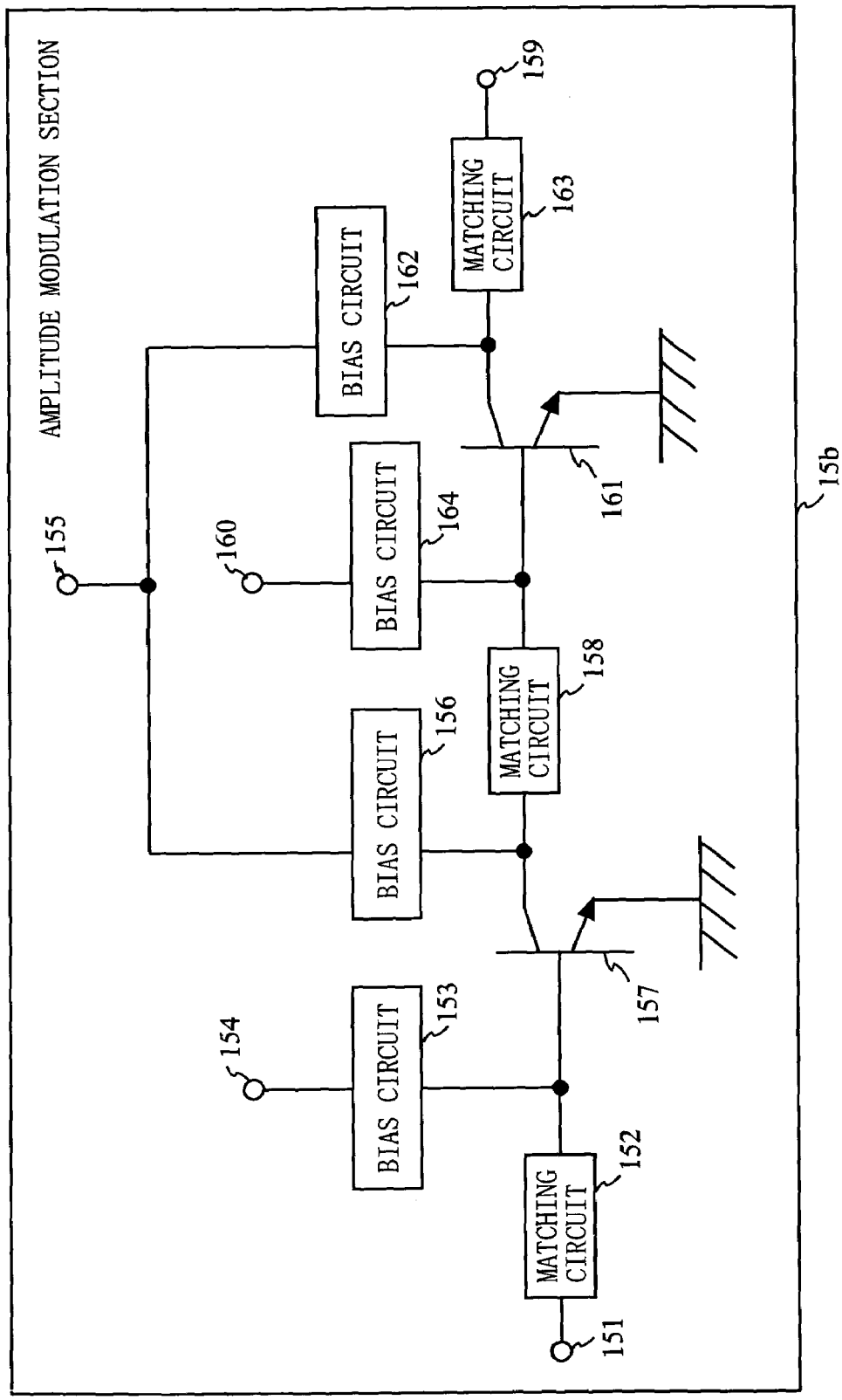
FIG. 10B is a block diagram illustrating an exemplary configuration of an amplitude modulation section 15b.

The amplitude modulation section 15 may be composed of an amplitude modulation section 15b illustrated in FIG. 10B. FIG. 10B is a block diagram illustrating an exemplary configuration of the amplitude modulation section 15b. In FIG. 10B, the amplitude modulation section 15b is basically configured by connecting two amplitude modulation sections 15a (described above) in series. It is here assumed that a transistor 157 and a transistor 161 are each a bipolar transistor. A bias voltage is supplied from a power supply terminal 154 via a bias circuit 153 to the base terminal the transistor 157. A bias voltage is supplied from a power supply terminal 160 via a bias circuit 164 to the base terminal of the transistor 161.

A signal depending on the magnitude of an amplitude signal is input from the regulator 17 via a power supply terminal 155 and a bias circuit 156 to the collector terminal of the transistor 157. The signal controlled depending on the magnitude of the amplitude signal m1(t) is input from the regulator 17 via the power supply terminal 155 and a bias circuit 162 to the collector terminal of the transistor 161. With such a configuration, the amplitude modulation section 15b can output a modulated signal having a dynamic range larger than that of the amplitude modulation section 15a of FIG. 10A. Note that a similar effect can be obtained even when the transistor 157 and the transistor 161 are each a field effect transistor. The amplitude modulation section 16 also has a configuration similar to that of the above-described amplitude modulation section 15.

The combining section 18 is composed of a combiner, such as a Wilkinson combiner, a 3-dB directional coupler (hybrid combiner), a Chireix combiner, or the like. Note that these combiners are commonly used and will not be described.

As described above, according to the transmission circuit 1 of the first embodiment of the present invention, when a magnitude of an amplitude component of input data is larger than a predetermined amplitude threshold value, the computation section 12 outputs an amplitude signal obtained by multiplying the magnitude of the amplitude component of the input data by a predetermined constant, a first phase signal corresponding to a phase component of the input data, and a second phase signal corresponding to a phase component of the input data. Therefore, when the magnitude of the amplitude component of the input data is larger than the predetermined amplitude threshold value, the transmission circuit 1 can combine the first modulated signal and the second modulated signal whose magnitudes vary depending on the amplitude signal and whose phases are the same, and output the combined signal as a transmission signal.

When the magnitude of the amplitude component of the input data is smaller than the predetermined amplitude threshold value, the computation section 12 outputs an amplitude signal obtained by multiplying the predetermined amplitude threshold value by a predetermined constant, a first phase signal obtained by shifting the phase component of the input data by a predetermined phase in one direction, and a second phase signal obtained by shifting the phase component of the input data by a predetermined phase in another direction. Therefore, when the magnitude of the amplitude component of the input data is smaller than the predetermined amplitude threshold value, the transmission circuit 1 can combine the first modulated signal and the second modulated signal whose magnitudes are the same and whose phases are different from each other, and output the combined signal as a transmission signal. Thereby, the transmission circuit 1 can output a transmission signal having high linearity with high efficiency independently of the magnitude of the output power which varies depending on the magnitude of the amplitude component of the input data.

In addition, since the transmission circuit 1 does not branch a signal output from the amplitude modulation section 15 and the amplitude modulation section 16 into a plurality of pieces. Therefore, a loss accompanying signal branching can be suppressed, thereby making it possible to reduce power consumption for a transmission circuit.

Second Embodiment

Figure 11:
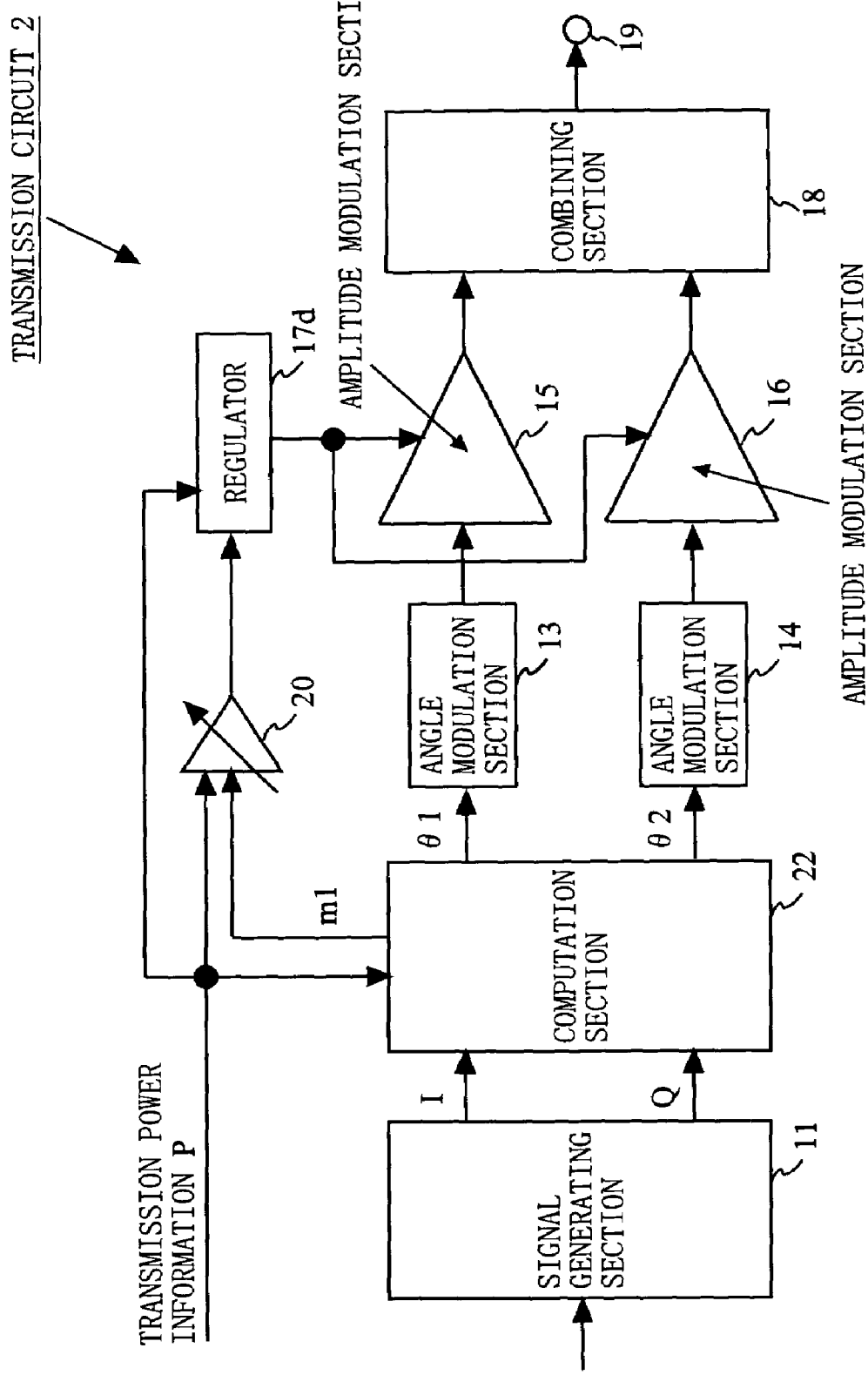
FIG. 11 is a block diagram illustrating an exemplary configuration of a transmission circuit 2 according to a second embodiment of the present invention.
Figure 12:
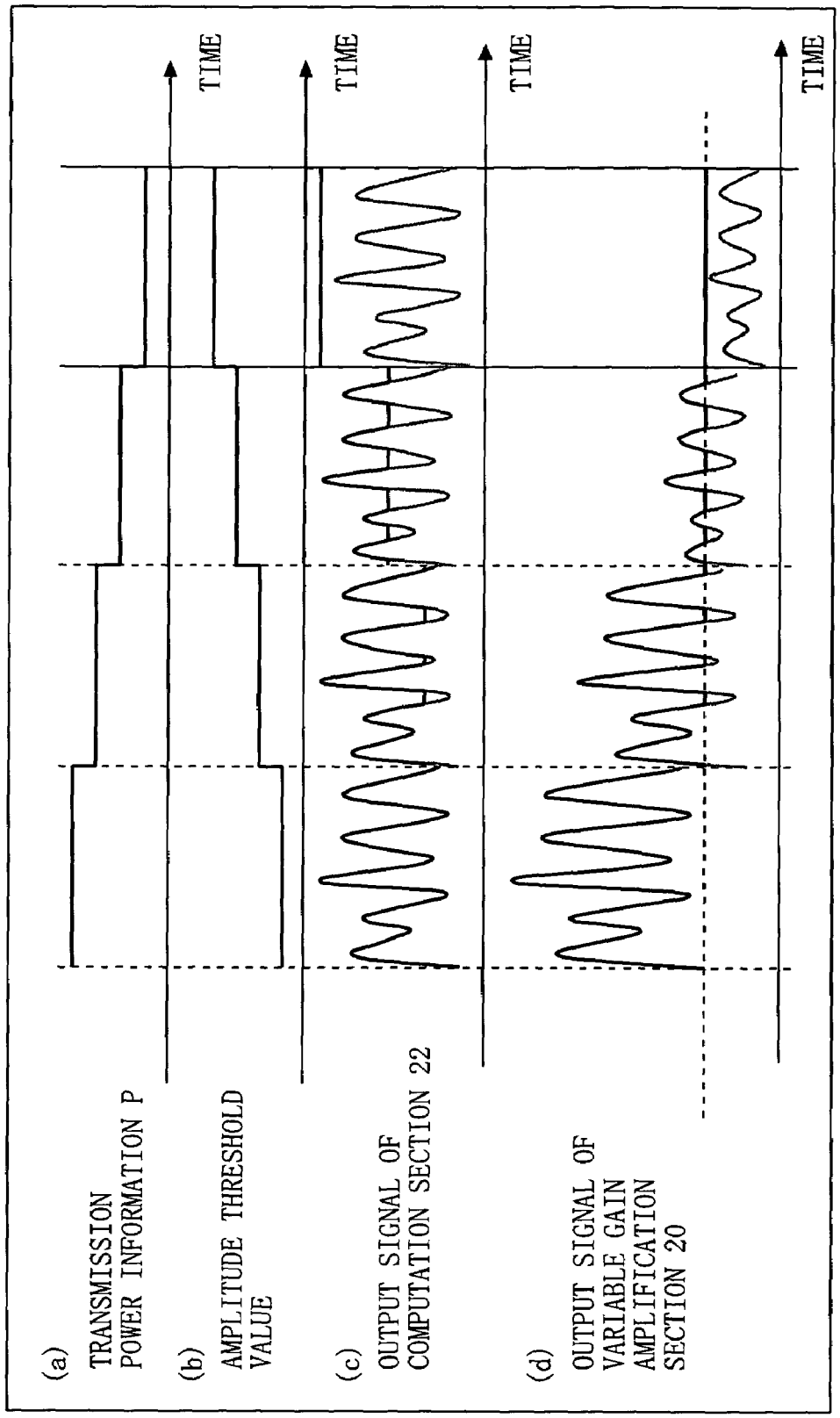
FIG. 12 is a diagram illustrating a signal used in each section of the transmission circuit 2.

FIG. 11 is a block diagram illustrating an exemplary configuration of a transmission circuit 2 according to a second embodiment of the present invention. In FIG. 11, the transmission circuit 2 is different from the transmission circuit 1 of the first embodiment in that a variable gain amplification section 20 is further provided. Also, an operation of a computation section 22 is different from that of the first embodiment. FIG. 12 is a diagram illustrating a signal used in each section of the transmission circuit 2. Hereinafter, an operation of the transmission circuit 2 will be described with reference to FIG. 12.

Transmission power information P indicating a magnitude of an output power of a transmission signal every a slot time is input to the transmission circuit 2 (see (a) of FIG. 12). The computation section 22 changes the magnitude of the predetermined amplitude threshold value 2m0 every the slot time based on the input transmission power information P. Specifically, the computation section 22 reduces the amplitude threshold value 2m0 with an increase in the transmission power information P, and increases the amplitude threshold value 2m0 with a decrease in the transmission power information P (see (b) of FIG. 12).

In other words, the computation section 22 changes the magnitude of the amplitude threshold value 2m0 so that a relationship between the magnitude of the amplitude threshold value 2m0 and the magnitude of the output power indicated by the transmission power information P has inverse characteristics. Typically, the computation section 22 changes the magnitude of the amplitude threshold value 2m0 so that the magnitude of the amplitude threshold value 2m0 is inversely proportional to a magnitude of the square root of the output power indicated by the transmission power information P. For example, the computation section 22 calculates a magnitude of an amplitude threshold value to be changed, depending on the magnitude of the square root of the output power indicated by the transmission power information P, with reference to a lookup table as illustrated in FIG. 13A. Note that it is assumed that an optimal amplitude threshold value is previously set in the lookup table. In the lookup table, K is an arbitrary constant. Alternatively, the computation section 22 may calculate the magnitude of an amplitude threshold value to be changed, by performing a predetermined computation process based on the transmission power information P, for example. As a result, the computation section 22 outputs an amplitude signal m1(t) as illustrated in (c) of FIG. 12.

The transmission power information P and the amplitude signal m1(t) are input to the variable gain amplification section 20. The variable gain amplification section 20 amplifies the amplitude signal m1(t) using a gain based on the transmission power information P. Note that the variable gain amplification section 20 changes the gain for amplifying the amplitude signal m1(t), based on the transmission power information P. Specifically, the variable gain amplification section 20 increases the gain for amplifying the amplitude signal m1(t), with an increase in the transmission power information P.

In other words, the variable gain amplification section 20 changes a magnitude of the gain for amplifying the amplitude signal m1(t) so that a relationship between the magnitude of the gain for amplifying the amplitude signal m1(t) and the magnitude of the output power indicated by the transmission power information P has direct characteristics. Typically, the variable gain amplification section 20 changes the magnitude of the gain for amplifying the amplitude signal m1(t) so that the magnitude of the gain for amplifying the amplitude signal m1(t) is directly proportional to the magnitude of the output power indicated by the transmission power information P. For example, the variable gain amplification section 20 calculates the magnitude of a gain to be changed, depending on a magnitude of the square root of the output power indicated by the transmission power information P, with reference to a lookup table as illustrated in FIG. 13B. Note that it is assumed that an optimal gain for amplifying the amplitude signal m1(t) is previously set in the lookup table. In the lookup table, L is an arbitrary constant. The variable gain amplification section 20 may calculate the magnitude of a gain to be changed, by performing a predetermined computation process based on the transmission power information P, for example. Alternatively, the variable gain amplification section 20 may be composed of a multiplication type DAC, and the amplitude signal m1(t) may be multiplied by the output power indicated by the transmission power information P. As a result, the variable gain amplification section 20 outputs an amplitude signal as illustrated in (d) of FIG. 12.

Figure 14:
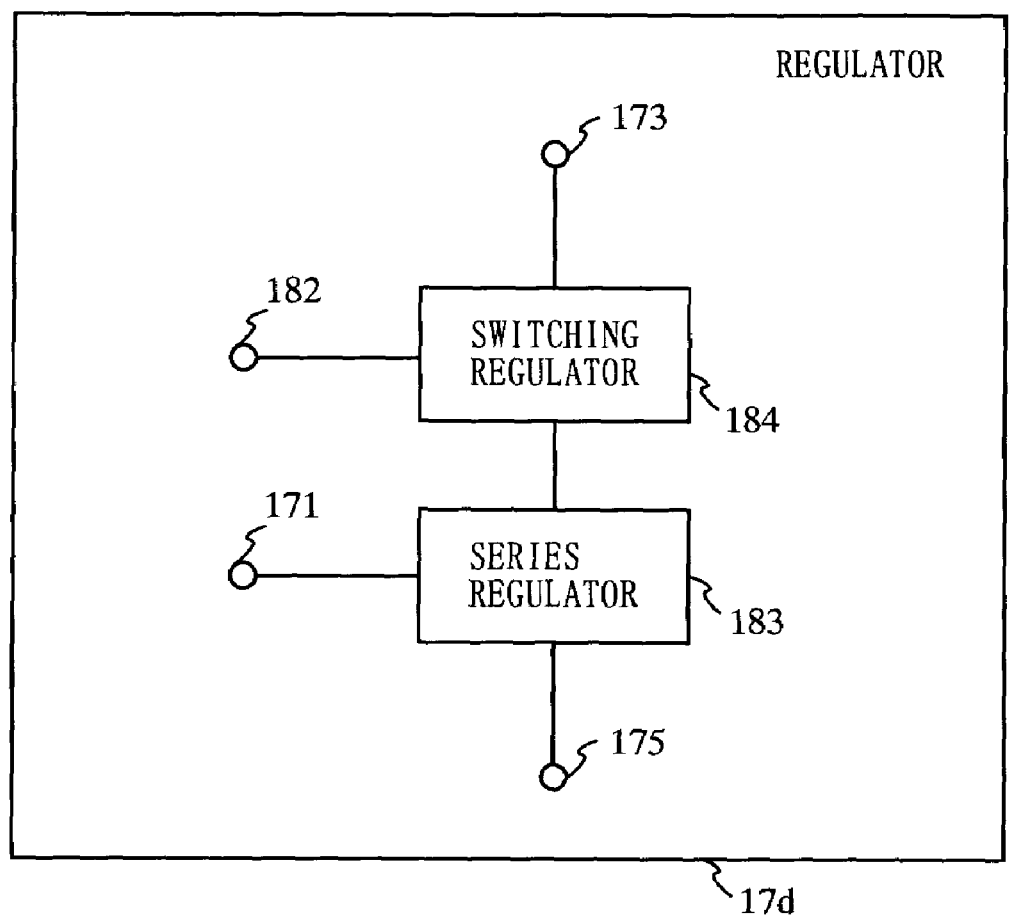
FIG. 14 is a block diagram illustrating an exemplary configuration of a regulator 17d.

FIG. 14 is a block diagram illustrating an exemplary configuration of the regulator 17d. In FIG. 14, the regulator 17d is composed of a combination of a series regulator and a switching regulator. The regulator 17d includes an input terminal 171, an input terminal 182, a power supply terminal 173, a series regulator 183, and a switching regulator 184. The series regulator 183 has, for example, a configuration illustrated in FIG. 9A. The switching regulator 184 has, for example, a configuration illustrated in FIG. 9B.

In FIG. 14, the amplitude signal m1(t) is input from the computation section 22 to the input terminal 171. The transmission power information P is input to the input terminal 182. Since the transmission power information P input to the input terminal 182 has a frequency smaller than that of the amplitude signal m1(t), the switching regulator 184 can operate with high efficiency. Also, since the voltage supplied from the switching regulator 184 is optimally controlled, the series regulator 183 can operate with high efficiency. Therefore, in the transmission circuit 2, by using the regulator 17d which is a combination of a series regulator and a switching regulator, it is possible to reduce power consumption for a transmission circuit. Note that, when the transmission power information P is a digital signal, the regulator 17d is assumed to further include a DAC for converting the transmission power information P into an analog signal.

As described above, according to the transmission circuit 2 of the second embodiment of the present invention, the computation section 22 changes the magnitude of the predetermined amplitude threshold value so that a relationship between the magnitude of the predetermined amplitude threshold value and the magnitude of the output power indicated by the transmission power information P has inverse characteristics, and the variable gain amplification section 20 changes the magnitude of the gain for amplifying the amplitude signal so that a relationship between the magnitude of the gain for amplifying the amplitude signal and the magnitude of the output power indicated by the transmission power information P has direct characteristics. Thereby, the transmission circuit 2 can output a transmission signal having high linearity with high efficiency even when the magnitude of the transmission power information P varies.

Third Embodiment

Figure 15:
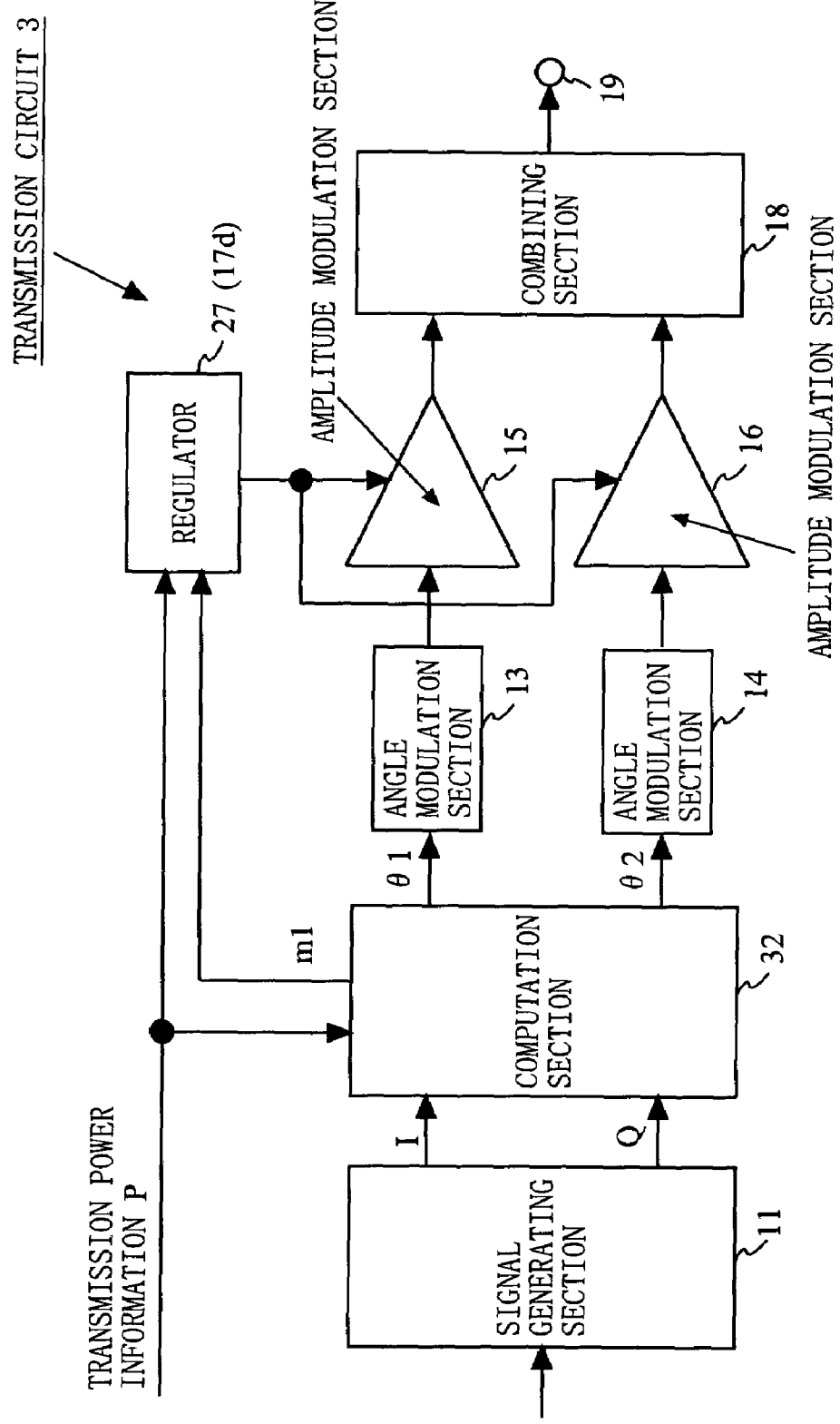
FIG. 15 is a block diagram illustrating an exemplary configuration of a transmission circuit 3 according to a third embodiment of the present invention.

FIG. 15 is a block diagram illustrating an exemplary configuration of a transmission circuit 3 according to a third embodiment of the present invention. In FIG. 15, the transmission circuit 3 comprises a signal generating section 11, a computation section 32, an angle modulation section 13, an angle modulation section 14, an amplitude modulation section 15, an amplitude modulation section 16, a regulator 27, a combining section 18, and an output terminal 19. The transmission circuit 3 is different from the transmission circuit 1 of the first embodiment in operations of the computation section 32 and the regulator 27. Note that the regulator 27 is similar to the regulator 17d of the second embodiment which has been described with reference to FIG. 14. Hereinafter, an operation of the transmission circuit 3 of the third embodiment of the present invention will be described, mainly focusing on the computation section 32.

Figure 16:
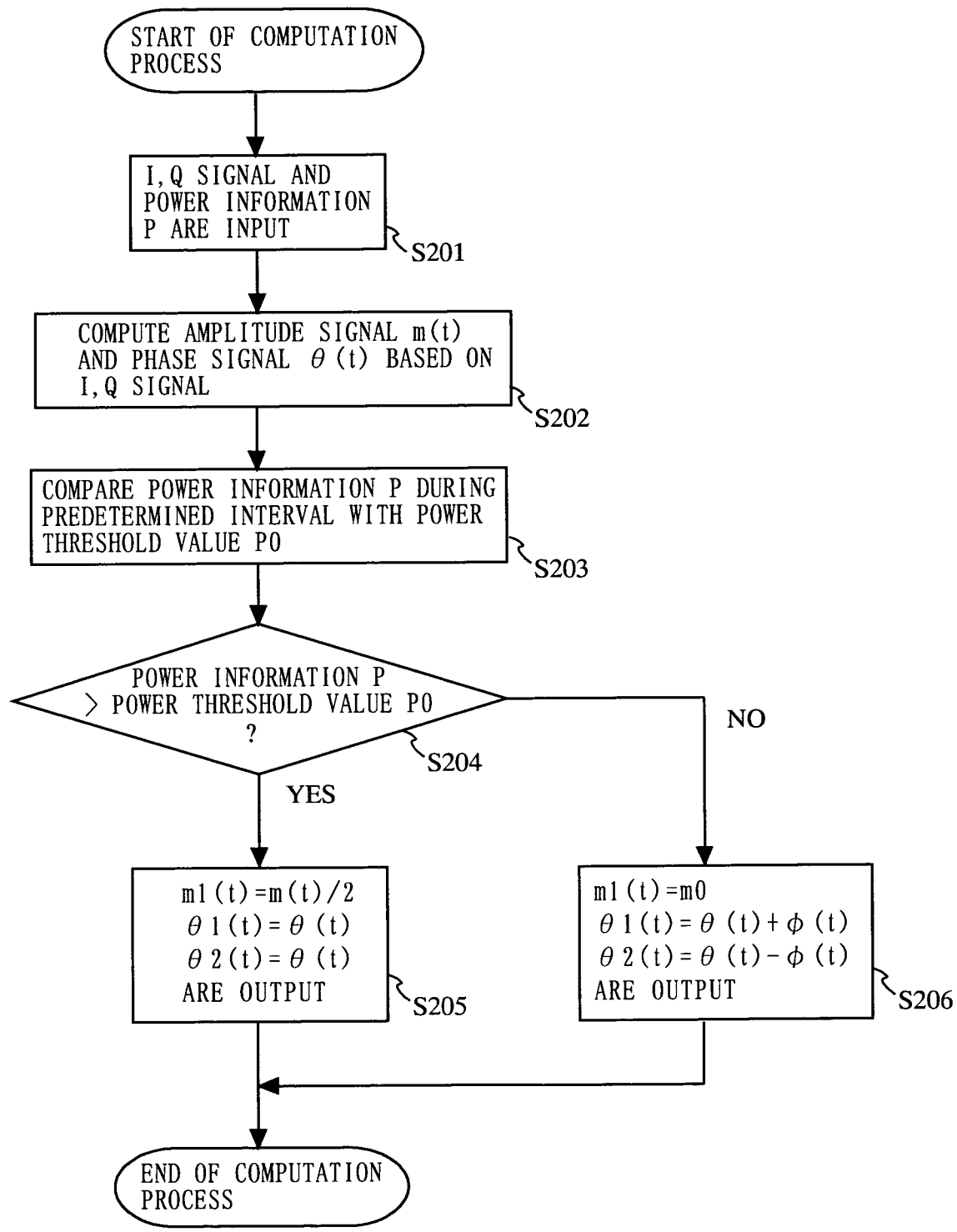
FIG. 16 is a flowchart of an exemplary operation of a computation section 32 of the third embodiment of the present invention.

FIG. 16 is a flowchart of an exemplary operation of the computation section 32 of the third embodiment of the present invention. Referring to FIG. 16, I and Q signals and transmission power information P are input to the computation section 32 (step S201). The computation section 32 generates an amplitude signal m(t) from the I and Q signals by a computation process represented by expression (1). In other words, the computation section 32 generates an amplitude signal m(t) corresponding to an amplitude component of input data. The computation section 32 also generates a phase signal θ(t) from the I and Q signal by a computation process represented by expression (2) (step S202). In other words, the computation section 32 generates a phase signal θ(t) corresponding to a phase component of input data.

$$m(t)=\sqrt{I(t)^2+Q(t)^2} \quad (1)$$

$$\theta(t)=arg(I(t)+jQ(t))=\tan^{-1}(Q(t)/I(t)) \quad (2)$$

The computation section 32 compares a magnitude of an output power indicated by the transmission power information P during a predetermined interval with a magnitude of a predetermined power threshold value P0 (step S203). Note that the predetermined interval is preferably a slot time. When the magnitude of the amplitude signal m(t) during the predetermined interval is larger than the predetermined power threshold value P0, the computation section 32 outputs an amplitude signal m1(t), a first phase signal θ(t) and a second phase signal θ2(t) which are represented by expressions (3) to (5) (steps S204 and S205).

$$m1(t) = \frac{m(t)}{2} \quad (3)$$

$$\theta1(t)=\theta(t) \quad (4)$$

$$\theta2(t)=\theta(t) \quad (5)$$

On the other hand, when the magnitude of the amplitude signal m(t) during the predetermined interval is smaller than the predetermined power threshold value P0, the computation section 32 outputs an amplitude signal m1(t), a first phase signal θ1(t) and a second phase signal θ2(t) which are represented by expression (6) to (8) (step S204 and S206). Note that φ(t) is obtained by expression (9). The subsequent operation is the same as that which has been described in the first and second embodiments and will not be described.

$$m1(t)=m0 \quad (6)$$

$$\theta1(t)=\theta(t)+f(t) \quad (7)$$

$$\theta2(t)=\theta(t)-f(t) \quad (8)$$

$$f(t) = \cos^{-1}\left[\frac{m(t)}{2m0}\right] \quad (9)$$

With such a configuration, the transmission circuit 3 can also obtain an effect similar to that of the first embodiment. Also, in the transmission circuit 3, since the computation section 32 compares the transmission power information P with the power threshold value P0 every a predetermined time (slot time), a load accompanying the computation process can be reduced. In addition, since the computation section 32 switches signals to be output, every the slot time which is slow compared to the sampling time, the rate of conversion required for analog parts can be reduced.

Note that, if a ratio of the amplitude signal m1(t) output when the magnitude of the amplitude signal m(t) is larger than the predetermined power threshold value P0 during the predetermined interval, to the amplitude signal m1(t) output when the magnitude of the amplitude signal m(t) is smaller than the predetermined power threshold value P0 during the predetermined interval, is the same, the computation section 32 may output an amplitude signal m1(t) having a magnitude other than those represented by expression (3) and expression (6). This is because the amplitude signal m1(t) is multiplied by a constant in the regulator 17. Specifically, when the magnitude of the amplitude signal m(t) during the predetermined interval is larger than the predetermined power threshold value P0, the computation section 32 may output an amplitude signal m1(t) which is obtained by multiplying the magnitude of the amplitude signal m(t) by A (A: an arbitrary constant). When the magnitude of the amplitude signal m(t) during the predetermined interval is smaller than the predetermined power threshold value P0, the computation section 32 may output an amplitude signal m1(t) which is obtained by multiplying the magnitude of the amplitude threshold value 2m0 by A.

Figure 17:
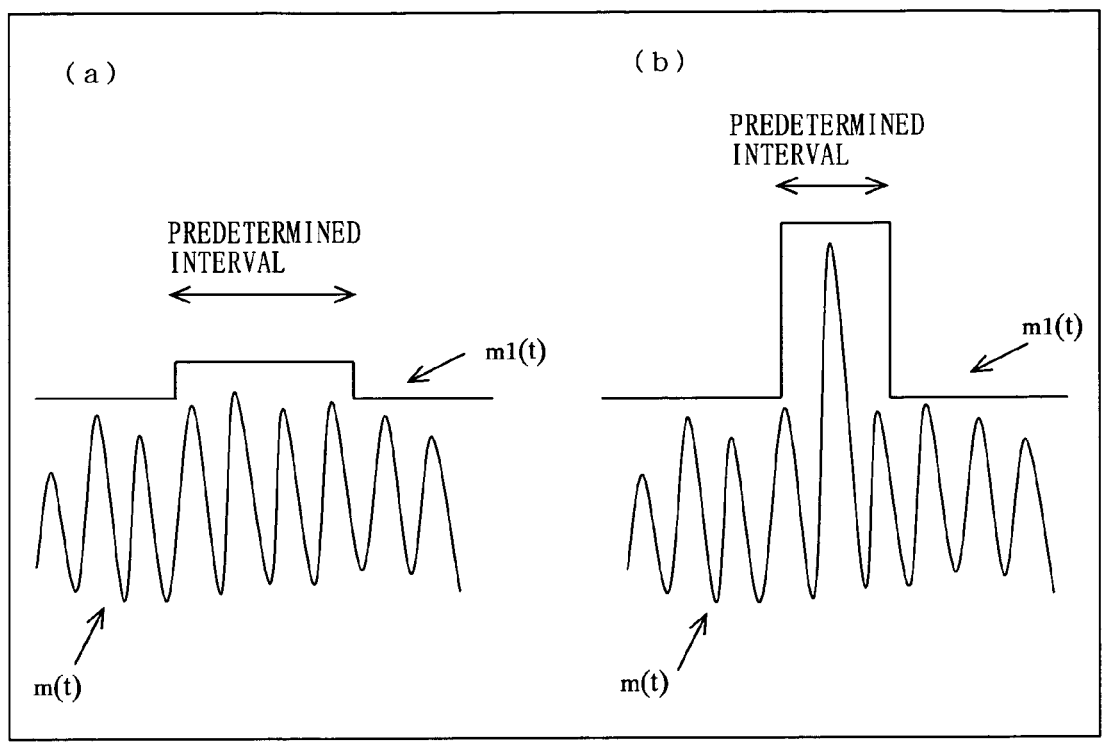
FIG. 17 is a diagram for describing an effect of reducing power consumption when a length of a predetermined interval is changed.

Also, in the transmission circuits of the first to third embodiments, the computation sections 12, 22 and 32 may change a length of the predetermined interval, depending on a change width of an envelope of a transmission signal, so as to further reduce power consumption for a transmission circuit. FIG. 17 is a diagram for describing the effect of reducing power consumption when the length of the predetermined interval is changed. As illustrated in (a) of FIG. 17, when there is a small variation in the envelope of a transmission signal, the power consumption reducing effect of the computation sections 12, 22 and 32 is small even when the predetermined interval is decreased. Therefore, the computation sections 12, 22 and 32 increases the predetermined interval. Note that the predetermined interval is preferably shorter than the slot time in which the output power of a transmission signal is controlled. On the other hand, as illustrated in (b) of FIG. 17, when there is a large variation in the envelope of a transmission signal, the computation sections 12, 22 and 32 reduce the predetermined interval, thereby making it possible to increase the power consumption reducing effect. For example, the computation sections 12, 22 and 32 reduce the predetermined interval in the case of the 16QAM modulation mode, since there is a larger envelope variation in the 16QAM modulation mode than in the QPSK modulation mode. Thereby, the computation sections 12, 22 and 32 can further reduce power consumption for a transmission circuit.

Since the change width of the envelope of a transmission signal varies depending on the modulation mode of the transmission signal, the computation sections 12, 22 and 32 may change the length of the predetermined interval, depending on the modulation mode of the transmission signal.

Figure 18A:
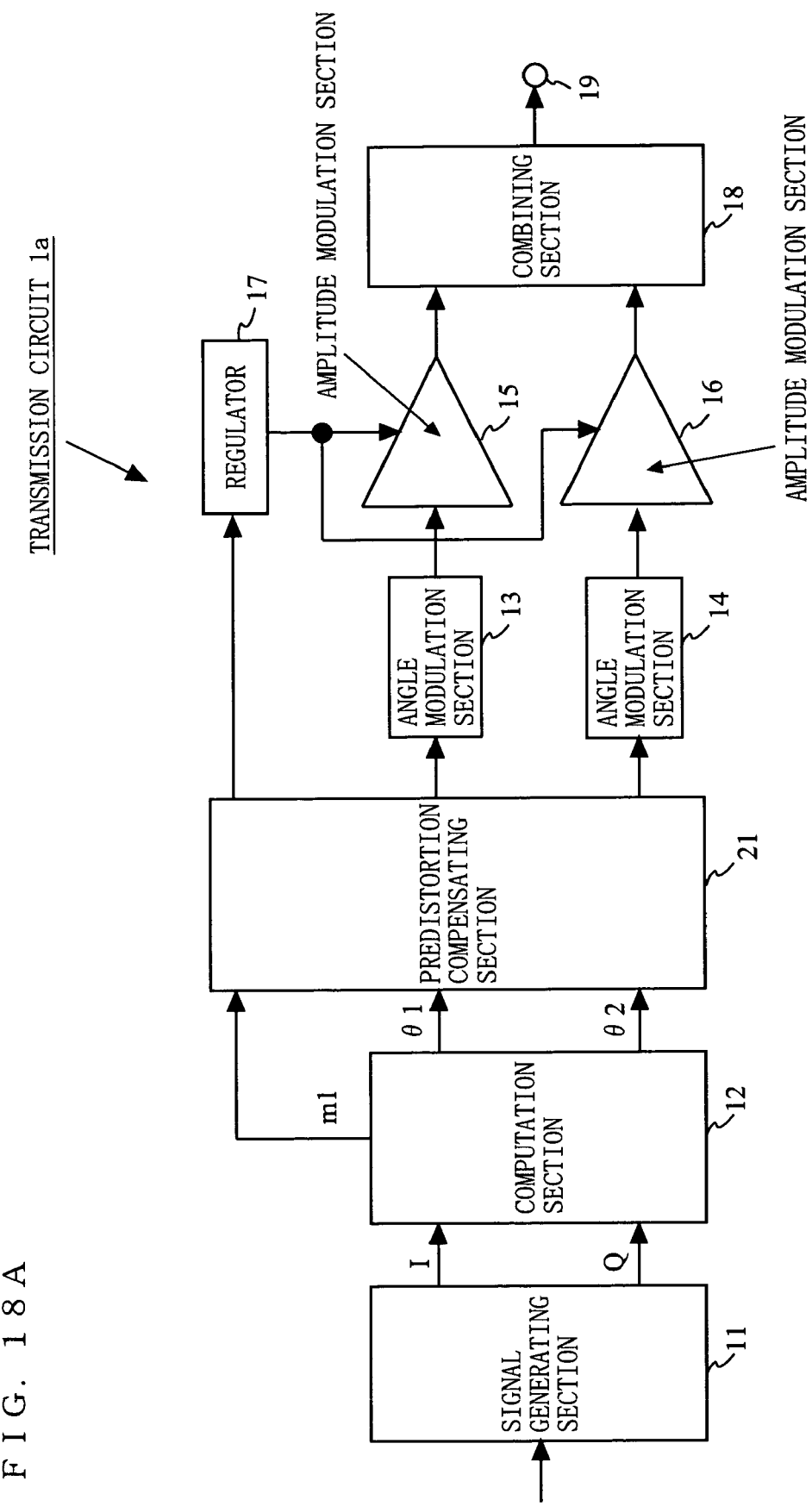
FIG. 18A is a block diagram illustrating an exemplary configuration of a transmission circuit 1a according to the first embodiment which comprises a predistortion compensating section 21.
Figure 18B:
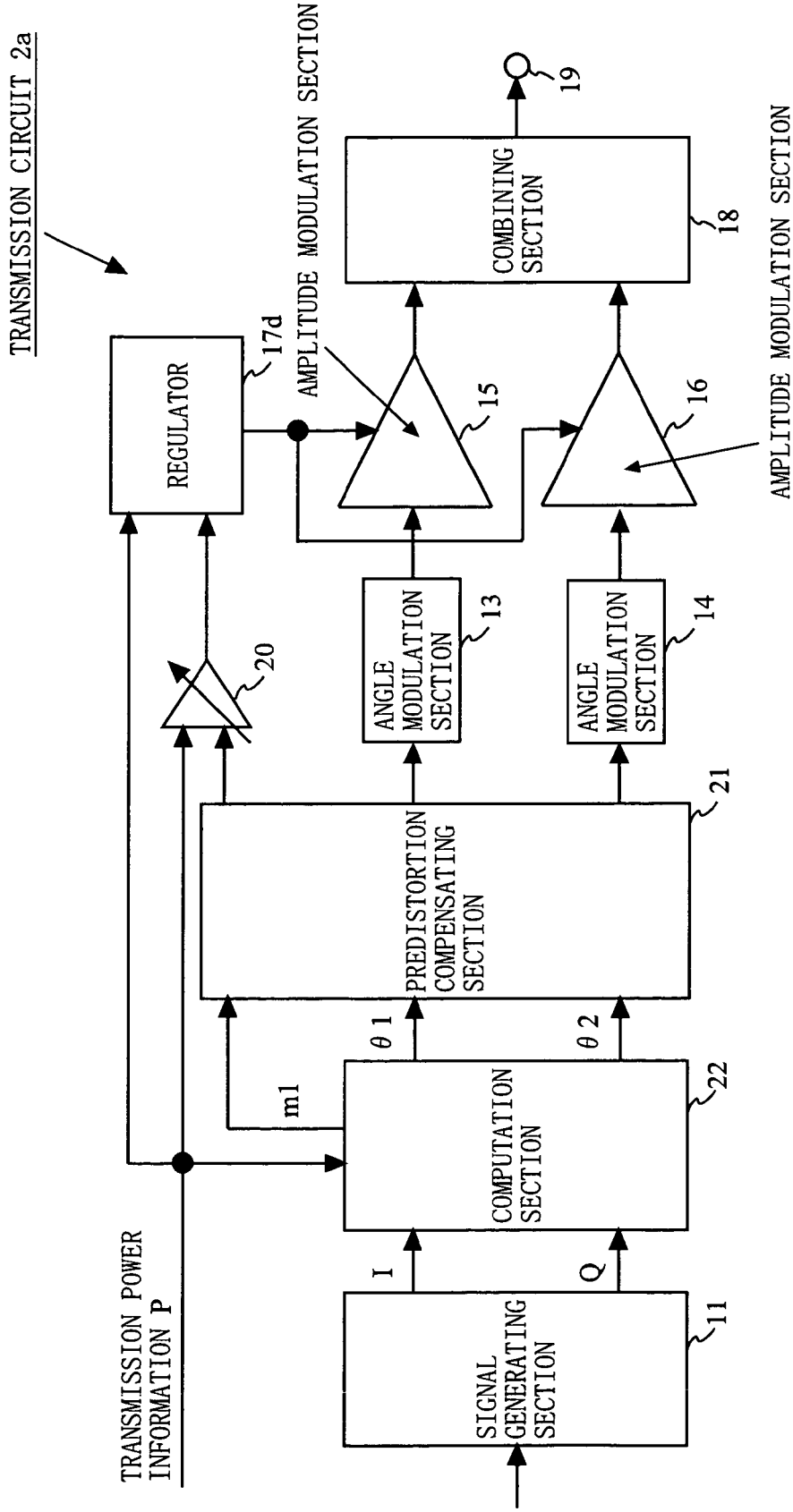
FIG. 18B is a block diagram illustrating an exemplary configuration of a transmission circuit 2a according to the second embodiment which comprises the predistortion compensating section 21.

Also, the transmission circuits 1 to 3 of the first to third embodiments may further comprise a predistortion compensating section 21 for compensating for a distortion in at least any one of the amplitude signal m1(t), the first phase signal θ1(t) and the second phase signal θ(t), at outputs of the computation sections 12, 22 and 32, so as to compensate for the non-linearity of at least any one of the angle modulation sections 13 and 14, the amplitude modulation sections 15 and 16, the regulator 17, and the variable gain amplification section 20. FIG. 18A is a block diagram illustrating an exemplary configuration of a transmission circuit 1a according to the first embodiment which comprises the predistortion compensating section 21. FIG. 18B is a block diagram illustrating an exemplary configuration of a transmission circuit 2a according to the second embodiment which comprises the predistortion compensating section 21. FIG. 18C is a block diagram illustrating an exemplary configuration of a transmission circuit 3a according to the third embodiment which comprises the predistortion compensating section 21. In FIGS. 18A to 18C, the predistortion compensating section 21 compensates for at least any one of the amplitude signal m1(t), the first phase signal θ1(t) and the second phase signal θ2(t) so that a distortion occurring in at least any one of the angle modulation sections 13 and 14, the amplitude modulation sections 15 and 16, the regulator 17, and the variable gain amplification section 20 is suppressed. Thereby, the transmission circuits 1a to 3a can increase the linearity of a transmission signal to a further level than in the transmission circuits of the first to third embodiments.

Fourth Embodiment

Figure 19:
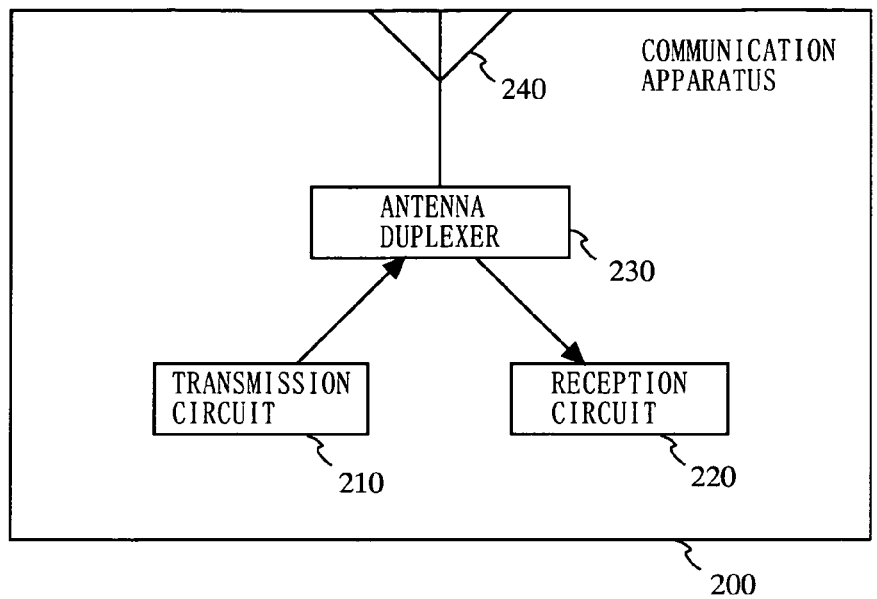
FIG. 19 is a block diagram illustrating an exemplary configuration of a communication apparatus according to a fourth embodiment of the present invention.
Figure 20:
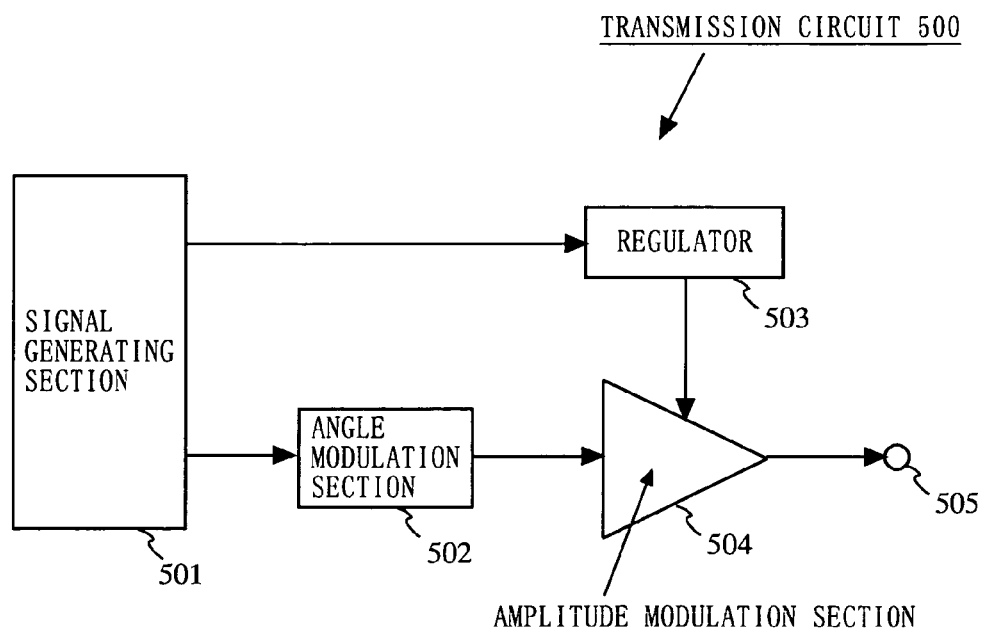
FIG. 20 is a block diagram illustrating a configuration of a conventional transmission circuit 500.
Figure 21:
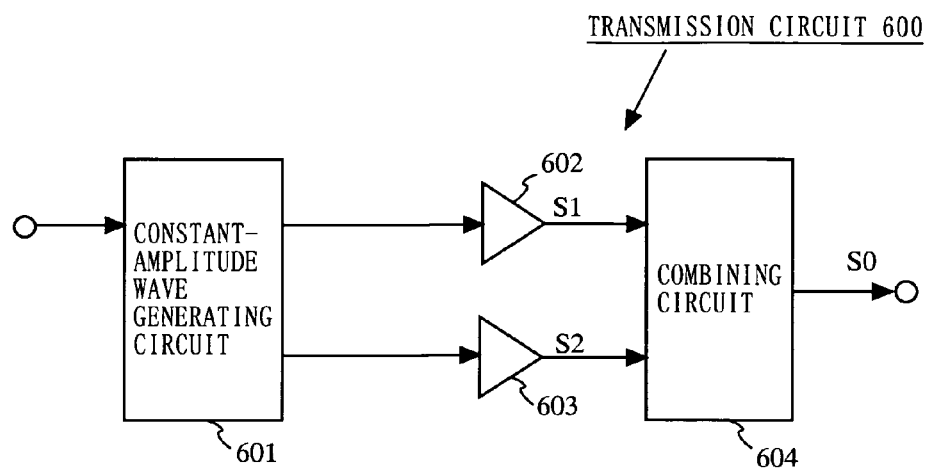
FIG. 21 is a block diagram illustrating a configuration of a conventional transmission circuit 600.
Figure 22:
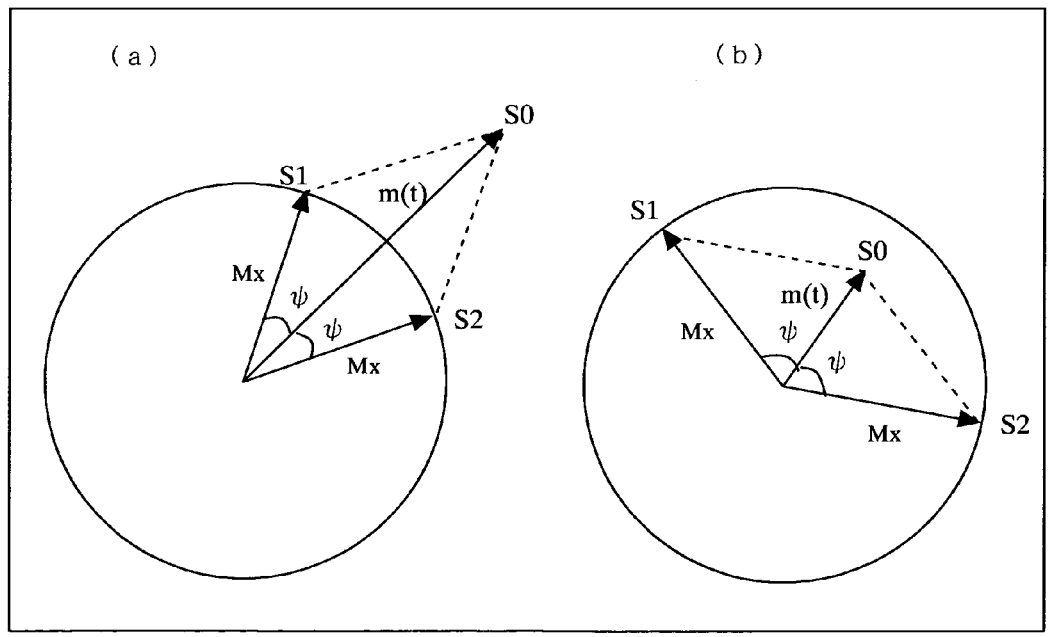
FIG. 22 is a diagram for specifically describing an operation of the conventional transmission circuit 600.
Figure 23:
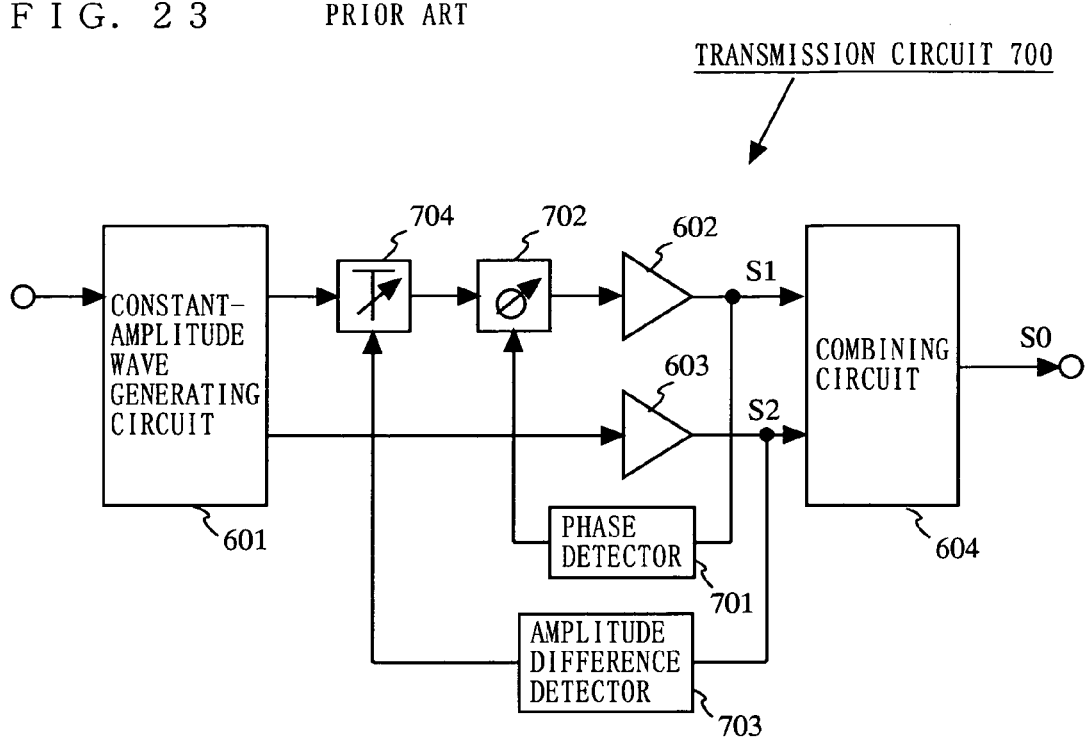
FIG. 23 is a block diagram illustrating a configuration of a conventional transmission circuit 700.
Figure 24:
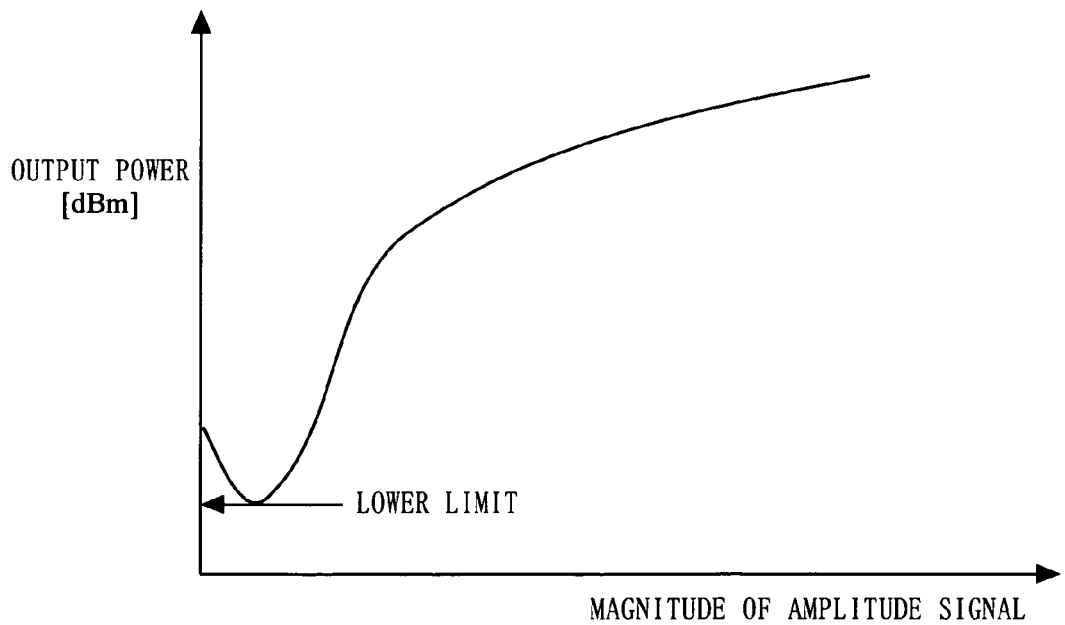
FIG. 24 is a diagram illustrating exemplary output characteristics of the conventional transmission circuit 500.

FIG. 19 is a block diagram illustrating an exemplary configuration of a communication apparatus according to a fourth embodiment of the present invention. Referring to FIG. 19, the communication apparatus 200 of the fourth embodiment comprises a transmission circuit 210, a reception circuit 220, an antenna duplexer 230, and an antenna 240.

The transmission circuit 210 is the transmission circuit described in any of the first to third embodiments. The antenna duplexer 230 transfers a transmission signal output from the transmission circuit 210 to the antenna 240, and prevents the transmission signal from leaking to the reception circuit 220. The antenna duplexer 230 also transfers a reception signal input from the antenna 240 to the reception circuit 220, and prevents the reception signal from leaking to the transmission circuit 210. Therefore, the transmission signal is output from the transmission circuit 210, and is emitted into space via the antenna duplexer 230 from the antenna 240. The reception signal is received by the antenna 240, and is received via the antenna duplexer 230 by the reception circuit 220. In the communication apparatus 200 of the fourth embodiment, by employing the transmission circuits of the first to third embodiments, a low distortion for a radio apparatus can be achieved while securing the linearity of a transmission signal. In addition, since there is not a branch, such as a directional coupler or the like, in the output of the transmission circuit 210, a loss from the transmission circuit 210 to the antenna 240 can be reduced, so that power consumption during transmission can be reduced. Therefore, a long-time use for a radio communication apparatus can be achieved. Note that the communication apparatus 200 may be composed only of the transmission circuit 210 and the antenna 240.

The transmission circuit of the present invention is applicable to a communication apparatus or the like for mobile telephony, wireless LAN or the like.

While the invention has been described in detail, the foregoing description is in all aspects illustrative and not restrictive. It is understood that numerous other modifications and variations can be devised without departing from the scope of the invention.

What is claimed is:

1. A transmission circuit for generating and outputting a transmission signal based on input data, comprising:
   a signal generating section for modulating the input data to generate data in a predetermined format;
   a computation section for computing the data generated by the signal generating section to output an amplitude signal, a first phase signal, and a second phase signal;
   a regulator for outputting a signal controlled depending on the amplitude signal;
   a first angle modulation section for angle-modulating the first phase signal and outputting the result as a first angle-modulated signal;
   a first amplitude modulation section for amplitude-modulating the first angle-modulated signal using the signal output from the regulator, and outputting the resultant angle-modulated and amplitude-modulated signal as a first modulated signal;
   a second angle modulation section for angle-modulating the second phase signal, and outputting the result as a second angle-modulated signal;
   a second amplitude modulation section for amplitude-modulating the second angle-modulated signal using the signal output from the regulator, and outputting the resultant angle-modulated and amplitude-modulated signal as a second modulated signal; and
   a combining section for combining the first modulated signal and the second modulated signal and outputting the result as the transmission signal,
   wherein the computation section calculates an amplitude component and a phase component of the data generated by the signal generating section, compares a magnitude of the amplitude component with a predetermined amplitude threshold value, and if the magnitude of the amplitude component is larger than the predetermined amplitude threshold value, outputs an amplitude signal obtained by multiplying the magnitude of the amplitude component by a predetermined constant, the first phase signal corresponding to the phase component, and the second phase signal corresponding to the phase component, and if the magnitude of the amplitude component is smaller than the predetermined amplitude threshold value, outputs an amplitude signal obtained by multiplying the predetermined amplitude threshold value by a predetermined constant, a first phase signal obtained by shifting the phase component by a predetermined phase in one direction, and a second phase signal obtained by shifting the phase component by a predetermined phase in another direction.

2. The transmission circuit according to claim 1, wherein transmission power information indicating a magnitude of an output power of the transmission signal is input, the computation section changes a magnitude of the predetermined amplitude threshold value predetermined amplitude threshold value and the magnitude of the output power indicated by the transmission power information has inverse characteristics, the transmission circuit further comprises a variable gain amplification section for amplifying the amplitude signal using a gain based on the transmission power information, and the variable gain amplification section changes a magnitude of the gain for amplifying the amplitude signal so that a relationship between the magnitude of the gain for amplifying the amplitude signal and the magnitude of the output power indicated by the transmission power information has direct characteristics.

3. The transmission circuit according to claim 2, wherein the computation section changes the magnitude of the amplitude threshold value so that the magnitude of the amplitude threshold value is inversely proportional to a magnitude of the square root of the output power indicated by the transmission power information.

4. The transmission circuit according to claim 2, wherein the computation section changes the magnitude of the amplitude threshold value, depending on the magnitude of the output power indicated by the transmission power information, with reference to a lookup table in which an optimal value is previously set.

5. The transmission circuit according to claim 2, wherein the variable gain amplification section changes the magnitude of the gain for amplifying the amplitude signal so that the magnitude of the gain for amplifying the amplitude signal is directly proportional to a magnitude of the square root of the output power indicated by the transmission power information.

6. The transmission circuit according to claim 2, wherein the variable gain amplification section changes the magnitude of the gain for amplifying the amplitude signal, depending on the magnitude of the output power indicated by the transmission power information, with reference to a lookup table in which an optimal value is previously set.

7. The transmission circuit according to claim 1, wherein the predetermined phase is obtained by calculating the arc cosine of a value obtained by dividing the magnitude of the amplitude component by the predetermined amplitude threshold value.

8. The transmission circuit according to claim 1, wherein the regulator is a switching regulator.

9. The transmission circuit according to claim 1, wherein the regulator is a series regulator.

10. The transmission circuit according to claim 2, wherein the regulator is composed of a switching regulator and a series regulator which are connected in series.

11. The transmission circuit according to claim 1, further comprising:

a predistortion compensating section for compensating for at least anyone of the amplitude signal, the first phase signal, and the second phase signal so that a distortion occurring in at least any one of the first angle modulation section, the second angle modulation section, the first amplitude modulation section, the second amplitude modulation section, and the regulator is suppressed, wherein the predistortion compensating section is provided at an output of the computation section.

12. The transmission circuit according to claim 1, wherein the computation section compares the magnitude of the amplitude component with the predetermined amplitude threshold value every a predetermined interval.

13. The transmission circuit according to claim 12, wherein the computation section, when the number of sampling points at which the magnitude of the amplitude component exceeds the predetermined amplitude threshold value is larger than or equal to a predetermined number during the predetermined interval, outputs an amplitude signal obtained by multiplying the magnitude of the amplitude component by a predetermined constant, the first phase signal corresponding to the phase component, and the second phase signal corresponding to the phase component, and when the number of sampling points at which the magnitude of the amplitude component exceeds the predetermined amplitude threshold value is smaller than the predetermined number during the predetermined interval, outputs an amplitude signal obtained by multiplying the predetermined amplitude threshold value by a predetermined constant, a first phase signal obtained by shifting the phase component by a predetermined phase in one direction, and a second phase signal obtained by shifting the phase component by a predetermined phase in another direction.

14. The transmission circuit according to claim 12, wherein the computation section changes a length of the predetermined interval, depending on a change width of an envelope of the transmission signal.

15. The transmission circuit according to claim 14, wherein the computation section, when the change width of the envelope of the transmission signal is small, decreases the predetermined interval, and when the change width of the envelope of the transmission signal is large, increases the predetermined interval.

16. A communication apparatus comprising:

a transmission circuit for generating a transmission signal; and an antenna for outputting the transmission signal generated by the transmission circuit, wherein the transmission circuit is the transmission circuit according to claim 1.

17. The communication apparatus according to claim 16, further comprising:

a reception circuit for processing a reception signal received from the antenna; and an antenna duplexer for outputting the transmission signal generated by the transmission circuit to the antenna, and outputting the reception signal received from the antenna to the reception circuit.

18. A transmission circuit for generating and outputting a transmission signal based on input data, comprising:

a signal generating section for modulating the input data to generate data in a predetermined format;

a computation section for computing the data generated by the signal generating section to output an amplitude signal, a first phase signal, and a second phase signal;

a regulator for outputting a signal controlled depending on the amplitude signal;

a first angle modulation section for angle-modulating the first phase signal and outputting the result as a first angle-modulated signal;

a first amplitude modulation section for amplitude-modulating the first angle-modulated signal using the signal output from the regulator, and outputting the resultant angle-modulated and amplitude-modulated signal as a first modulated signal;

a second angle modulation section for angle-modulating the second phase signal, and outputting the result as a second angle-modulated signal;

a second amplitude modulation section for amplitude-modulating the second angle-modulated signal using the signal output from the regulator, and outputting the resultant angle-modulated and amplitude-modulated signal as a second modulated signal; and a combining section for combining the first modulated signal and the second modulated signal and outputting the result as the transmission signal, wherein transmission power information indicating a magnitude of an output power of the transmission signal is input, and the computation section calculates an amplitude component and a phase component of the data generated by the signal generating section, compares the magnitude of the transmission power information with a magnitude of a predetermined power threshold value, and if the magnitude of the transmission power information is larger than the predetermined power threshold value, outputs an amplitude signal obtained by multiplying the magnitude of the amplitude component by a predetermined constant, the first phase signal corresponding to the phase component, and the second phase signal corresponding to the phase component, and if the magnitude of the transmission power information is smaller than the predetermined amplitude threshold value, outputs an amplitude signal obtained by multiplying the predetermined power threshold value by a predetermined constant, a first phase signal obtained by shifting the phase component by a predetermined phase in one direction, and a second phase signal obtained by shifting the phase component by a predetermined phase in another direction.

* * * * *

UNITED STATES PATENT AND TRADEMARK OFFICE
CERTIFICATE OF CORRECTION

PATENT NO. : 7,496,333 B2
APPLICATION NO. : 11/633510
DATED : February 24, 2009
INVENTOR(S) : Toru Matsuura et al.

It is certified that error appears in the above-identified patent and that said Letters Patent is hereby corrected as shown below:

Column 21

In lines 19-20, the phrase "predetermined amplitude threshold value predetermined" should read --predetermined amplitude threshold value so that a relationship between the magnitude of the predetermined--.

Signed and Sealed this

Twenty-second Day of December, 2009

David J. Kappos
*Director of the United States Patent and Trademark Office*